(12) United States Patent
Yang

(10) Patent No.: US 9,302,768 B2
(45) Date of Patent: Apr. 5, 2016

(54) AIRCRAFT CAPABLE OF TAKEOFF/LANDING VIA THE FUSELAGE THEREOF, AND TAKEOFF/LANDING SYSTEM FOR THE AIRCRAFT

(75) Inventor: Donggyu Yang, Seoul (KR)

(73) Assignee: Donggyu Yang, Seoul (KR)

( * ) Notice: Subject to any disclaimer, the term of this patent is extended or adjusted under 35 U.S.C. 154(b) by 0 days.

(21) Appl. No.: 14/415,438

(22) PCT Filed: Jul. 17, 2012

(86) PCT No.: PCT/KR2012/005698
§ 371 (c)(1),
(2), (4) Date: Jan. 16, 2015

(87) PCT Pub. No.: WO2014/014136
PCT Pub. Date: Jan. 23, 2014

(65) Prior Publication Data
US 2015/0217860 A1    Aug. 6, 2015

(51) Int. Cl.
*B64C 25/32* (2006.01)
*B64C 25/04* (2006.01)
*B64F 1/02* (2006.01)
*B64F 1/04* (2006.01)
*B64C 25/14* (2006.01)
*B64C 25/62* (2006.01)

(52) U.S. Cl.
CPC ............ *B64C 25/32* (2013.01); *B64C 25/04* (2013.01); *B64C 25/14* (2013.01); *B64C 25/62* (2013.01); *B64F 1/02* (2013.01); *B64F 1/04* (2013.01); *Y02T 50/82* (2013.01)

(58) Field of Classification Search
CPC ........ B64C 25/32; B64C 25/04; B64C 25/14; B64C 25/62; B64F 1/02; B64F 1/04
See application file for complete search history.

(56) References Cited

U.S. PATENT DOCUMENTS

| 2,246,716 | A | * | 6/1941 | Bottril | B64F 1/10 105/463.1 |
| 2,425,886 | A | * | 8/1947 | Knox | B64F 1/04 244/110 E |

(Continued)

FOREIGN PATENT DOCUMENTS

JP       07-037899 U    7/1995
KR   20-2008-0002540 U  7/2008

OTHER PUBLICATIONS

International Search Report (in Korean and English) and Written Opinion (in Korean) for PCT/KR2012/005698, mailed Mar. 4, 2013; ISA/KR.

*Primary Examiner* — Justin Benedik

(57) ABSTRACT

The aircraft capable of takeoff/landing via the fuselage thereof and the takeoff/landing system of the aircraft according to the present invention are configured such that multiple takeoff/landing rollers are arranged in a sliding direction such that the aircraft fuselage having a landing surface formed at the bottom thereof can safely land and slide in a sliding direction, thus enabling the aircraft fuselage to contact a running surface and takeoff/land without separate landing gear. Thus, not only can the weight of the aircraft be reduced, but the fuel consumption of the aircraft can be reduced as well, the useful space in the aircraft can be broadened, the length of the runway can be shortened due to the frictional force generated by the takeoff/landing device, and the safety during the takeoff/landing of the aircraft can be improved.

20 Claims, 13 Drawing Sheets

(56) References Cited

U.S. PATENT DOCUMENTS

| | | | | | |
|---|---|---|---|---|---|
| 3,003,717 | A | * | 10/1961 | Booker | B64D 5/00 244/114 R |
| 3,128,066 | A | * | 4/1964 | Bailey | B64F 1/10 244/110 E |
| 3,380,690 | A | * | 4/1968 | Rego | B64F 1/10 244/114 R |
| 4,653,706 | A | * | 3/1987 | Ragiab | B64F 1/10 114/262 |
| 5,170,966 | A | * | 12/1992 | Sheu | B64F 1/02 244/110 E |
| 5,470,033 | A | * | 11/1995 | Tsai | B64F 1/10 104/245 |
| 6,394,391 | B1 | * | 5/2002 | Lo | B64F 1/10 244/110 A |
| 6,695,255 | B1 | * | 2/2004 | Husain | B64C 25/68 244/110 E |
| 7,568,658 | B2 | * | 8/2009 | Li | B64F 1/10 244/110 E |
| 8,485,468 | B2 | * | 7/2013 | Binnebesel | B64F 1/002 244/110 E |
| 9,139,309 | B1 | * | 9/2015 | Al-Heraibi | B64F 1/10 |
| 9,156,564 | B2 | * | 10/2015 | Endres | B64F 1/002 |

* cited by examiner

AIRCRAFT CAPABLE OF TAKEOFF/LANDING VIA THE FUSELAGE THEREOF, AND TAKEOFF/LANDING SYSTEM FOR THE AIRCRAFT

CROSS-REFERENCE TO RELATED APPLICATIONS

This application is a 371 U.S. National Stage of International Application No. PCT/KR2012/005698, filed on Jul. 17, 2012 and published in Korean as WO 2014/014136 A1 on Jan. 23, 2014. The entire disclosure of the above application is incorporated herein by reference.

BACKGROUND OF THE INVENTION

1. Field of the Invention

The present disclosure relates to a fuselage takeoff and landing enabled aircraft without having a landing apparatus such as a landing gear, and a takeoff and landing system thereof.

2. Description of the Related Art

In general, the technologies of aircraft takeoff and landing having a fixed lift generation apparatus have been progressed in a state that takeoff and landing by means of a landing apparatus and takeoff and landing on a paved runway are regarded as the standard method since its initial powered flight. Accordingly, studies on the development of wing shapes, engine technologies, thermal resistant and light weight materials, and the like, mainly associated with the speed and safety enhancement, have been primarily carried out in the development process of technologies such as increased speed, light weight, safety enhancement, increased use of electronic parts, increased size in the aviation field.

However, in spite of the technological development, aircraft takeoff and landing accidents have been continued and gradually increased in their size and scope, but schemes for reducing the occurrence of takeoff and landing accidents and reducing the weight of aircraft through a change of aviation mechanism have been scarcely provided until the present.

Landing apparatus is an indispensable element for aircraft takeoff and landing. A landing apparatus having a capacity of sustaining a large load may be required to enhance the safety during the takeoff and landing of an aircraft. However, if the weight of the landing apparatus is increased, then that of the aircraft will be also increased to that extent, and thus the weight of the landing apparatus will be limited to reduce the weight of the aircraft.

The weight of a landing apparatus such as a landing gear applied to medium to large sized passenger planes is typically about 4.435-4.445% of the maximum takeoff weight. The landing apparatus occupies a large fraction of the aircraft weight since it corresponds to a weight of about 8-10% of the aircraft empty weight. Accordingly, if the landing apparatus can be removed, then it may be possible to enhance economic effects in the aviation industry such as additionally creating a weight reduction effect on other members, and the like, in addition to an effect due to reducing the weight of the landing apparatus.

Furthermore, a conventional aircraft takes off using only a thrust of the engine generated by the relevant aircraft, and thus a lot of fuel is consumed during takeoff. Accordingly, if energy required for takeoff may be additionally provided during the takeoff of the aircraft in addition to a thrust of the relevant aircraft, then the weight of the aircraft may be further reduced, thereby further enhancing the economic effect in the aviation industry.

Moreover, considering the fact that 70-80% of aircraft accidents are occurred during takeoff and landing, it may greatly contribute a reduction in the number of aircraft accidents when the existing landing apparatus is removed or changed.

SUMMARY OF THE INVENTION

An object of the present disclosure is to provide a fuselage takeoff and landing enabled aircraft and a takeoff and landing system thereof in which a landing apparatus is removed and thus an aircraft body is taken off and landed in the state of being directly brought into contact with a virtual runway surface, thereby reducing the weight of an aircraft to enhance economic effects in the aviation field as well as reducing the number of aircraft takeoff and landing accidents.

In order to accomplish the objective of the present disclosure, there is provided a fuselage takeoff and landing enabled aircraft, wherein a landing surface is formed at a bottom surface of the aircraft fuselage such that the aircraft fuselage is placed on a virtual runway surface to allow takeoff and landing.

Here, a rail catcher assembly docked with a guide rail provided on the virtual runway surface to support the aircraft fuselage to maintain the center line of movement may be provided on the aircraft fuselage.

Furthermore, a catcher accommodation space may be formed to accommodate the rail catcher assembly in the aircraft fuselage, and a catcher draw-in/out unit for drawing in and out the rail catcher assembly may be provided in the catcher accommodation space.

Furthermore, the rail catcher assembly may be configured such that a plurality of members are combined with one another to be extended or contracted while being slid or rotated, and a support member is provided at an end portion of the rail catcher assembly such that the rail catcher assembly is restricted while being slid into the guide rail.

Furthermore, a catcher correction unit may be provided between the aircraft fuselage and rail catcher assembly to move the rail catcher assembly in the left and right direction perpendicular to the runway direction with respect to the aircraft fuselage.

Furthermore, a shock absorption unit may be provided at the aircraft fuselage to absorb a collision force due to a contact with the virtual runway surface.

Furthermore, the shock absorption unit may be provided therein to be located at a front side of the central position of gravity or center of gravity on the basis of the center of gravity of the aircraft fuselage.

Furthermore, a rail catcher assembly docked with a guide rail provided on the virtual runway surface to support the aircraft fuselage to maintain the center line of movement may be provided on the aircraft fuselage, and the shock absorption unit may be located at both left and right sides of the rail catcher assembly.

In addition, in order to accomplish the objective of the present disclosure, there is provided an aircraft takeoff and landing system including a takeoff and landing guide apparatus having a runway surface body on which the foregoing aircraft fuselage is placed to allow takeoff and landing while the aircraft fuselage is slid in the runway direction, wherein a plurality of rollers for takeoff and landing to drive the aircraft while being rotated in the runway direction of the aircraft fuselage are provided on the runway surface body along the runway direction of the aircraft fuselage.

Here, a guide rail docked with a rail catcher assembly provided in the aircraft to guide the takeoff and landing of the aircraft may be provided on the runway surface body along the runway direction of the aircraft fuselage.

Furthermore, the runway surface body may be combined with an elevation unit for takeoff and landing for moving the runway surface body in the upward and downward direction.

Furthermore, the runway surface body may be divided into a runway surface body for takeoff and landing and a runway surface body for run according to the runway direction of the aircraft fuselage, and the runway surface body for takeoff and landing may be provided with the elevation unit for takeoff and landing.

Furthermore, the elevation unit for takeoff and landing may detect a landing speed and a descending speed of the aircraft to control a descending speed of the runway surface body in interlock with the landing speed and descending speed of the aircraft.

Furthermore, the takeoff and landing guide apparatus may include a supporting body provided at the ground; a runway surface body provided at an upper surface of the supporting body; and an elevation unit for takeoff and landing provided between the supporting body and the runway surface body to move the runway surface body in the upward and downward direction with respect to the supporting body.

Furthermore, a wheel for movement may be further provided at a lower end of the takeoff and landing guide apparatus to move the takeoff and landing guide apparatus along the ground.

Furthermore, a movement rail having a predetermined depth may be installed on the ground to insert and move the wheel for movement.

Furthermore, a landing position correction unit may be further provided between the aircraft and the takeoff and landing guide apparatus to allow the takeoff and landing guide apparatus to move according to the position of the aircraft fuselage.

Furthermore, the runway surface body may be divided into a plurality of sections, and rollers for takeoff and landing provided at the plurality of sections may be connected to one another by the same electromotive member, respectively.

Furthermore, at least two or more rollers for takeoff and landing may be mechanically connected to one motor.

Furthermore, the roller for takeoff and landing may be provided to increase or decrease the rotation speed while being synchronized in interlock with the driving speed of the aircraft fuselage.

Furthermore, a roller braking unit may be provided at a side of the roller for takeoff and landing to stop the rotation of the roller for takeoff and landing.

Furthermore, a carriage for fuselage transportation to move the aircraft fuselage from the runway surface body to another place may be further provided at the middle or end of the takeoff and landing guide apparatus.

Furthermore, a plurality of rollers for transportation rotated in a different direction from the rotation direction of the roller for takeoff and landing may be provided between the rollers for takeoff and landing.

Furthermore, a fuselage elevation unit for elevating the roller for transportation higher than the roller for takeoff and landing to move and load the aircraft fuselage to a carriage for fuselage transportation may be further provided at the takeoff and landing guide apparatus.

According to a fuselage takeoff and landing enable aircraft and a takeoff and landing system thereof in accordance with the present disclosure, the existing heavy landing apparatus may be removed to allow the aircraft fuselage to be directly placed on a runway, thereby reducing the weight of the aircraft as much as the landing apparatus and the other members associated with the landing apparatus. Through this, fuel consumption can be reduced during the flight of the aircraft, and an effective space within the aircraft may be increased by removing or reducing a space required for the installation of the landing apparatus as well as reducing fuel capacity, thereby enhancing economic effects in the aviation industry.

Furthermore, it may be possible to reduce a thrust that should be generated by the aircraft due to using the power of a takeoff and landing apparatus in addition to a thrust of the engine generated by the relevant aircraft during the takeoff of the aircraft. Moreover, takeoff may be performed using the thrust of the aircraft and the power of the takeoff and landing apparatus at the same time or landing may be performed using a frictional force of the takeoff and landing apparatus to reduce the length of the runway, thereby further enhancing economic effects in the aviation industry.

In addition, a landing apparatus may be removed or the aircraft fuselage may be directly placed on a runway to perform takeoff and landing, and thus the aircraft can perform takeoff and landing in a safe manner, thereby greatly reducing aircraft accidents.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a fuselage takeoff and landing enabled aircraft and a takeoff and landing system thereof according to the present disclosure will be described in detail according to an embodiment illustrated in the accompanying drawings.

Figure 1:
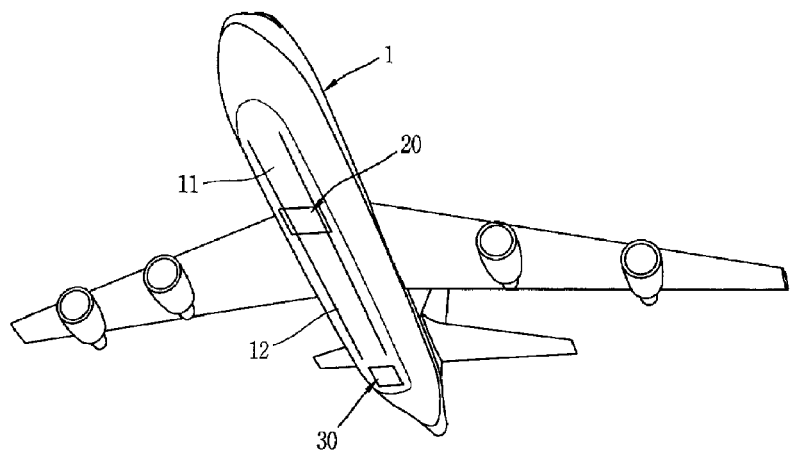
FIG. 1 is a bottom perspective view illustrating an aircraft capable of performing takeoff and landing according to the present disclosure.
Figure 2:
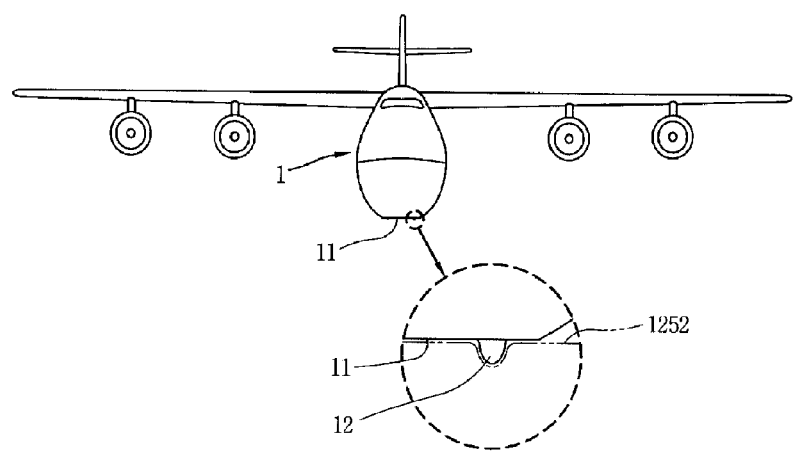
FIG. 2 is a front view illustrating an aircraft according to FIG. 1.

FIG. 1 is a bottom perspective view illustrating an aircraft capable of performing takeoff and landing according to the present disclosure, and FIG. 2 is a front view illustrating an aircraft according to FIG. 1.

Figure 3:
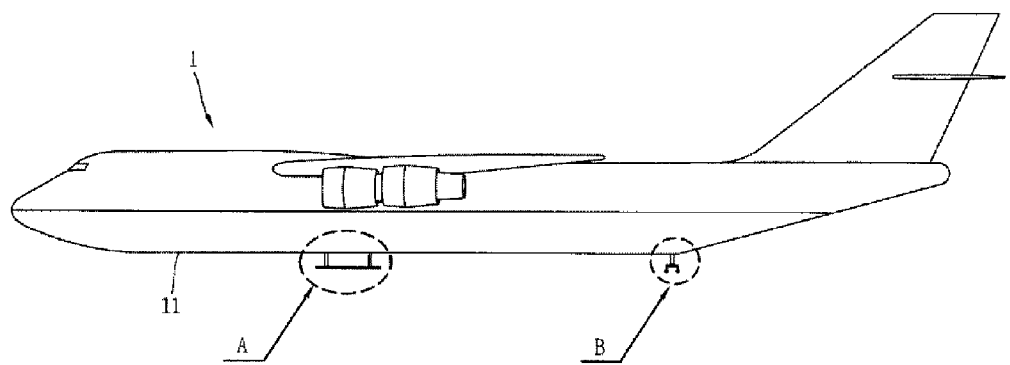
FIG. 3 is a side view illustrating an aircraft according to FIG. 1.

As illustrated in FIGS. 1 through 3, an aircraft according to the present embodiment may be formed with a landing surface 11 having a plane at a bottom surface of the aircraft fuselage 1 such that a bottom surface of the aircraft fuselage 1 is directly placed on a virtual runway surface to perform takeoff and landing.

A typical aircraft is installed with a main landing gear at the main wing and a front landing gear (or nose landing gear) at a front side of the aircraft fuselage, respectively, but according to the present embodiment, a landing surface 11 may be formed such that the landing gear and the front landing gear are removed and a bottom surface of the aircraft fuselage 1 is directly placed a virtual runway surface. Accordingly, the bottom surface of an aircraft according to the present embodiment may be formed in a plane shape whereas the bottom surface of a typical aircraft is formed in a curved surface shape.

The landing surface 11 may be preferably formed with a wide area if possible to allow the aircraft fuselage 1 to be placed on a virtual runway surface in a safe manner, but an area of the landing surface 11 may be suitably designed by taking fuselage weight, and the like, into consideration. However, the landing surface 11 may be preferably formed with a streamlined shape along the runway direction to minimize air resistance at front and rear sides of the aircraft fuselage 1 as well as minimize a contact impact to the virtual runway surface, thereby allowing the aircraft fuselage to perform takeoff and landing in a safe manner.

Furthermore, since a landing gear is removed from the aircraft, the aircraft may be configured with a so-called high wing type aircraft in which a main wing 2 is provided at an upper side of the aircraft fuselage 1 as illustrated in FIGS. 1 and 2, or the engine may be provided at an upper surface of the main wing even in a low wing type aircraft in which the main wing is provided at a bottom surface of the aircraft fuselage, though not shown in the drawing. Accordingly, the wing or engine can maintain a sufficient distance from the ground or virtual runway surface without being hit against the ground or virtual runway surface.

Furthermore, the aircraft may be directly brought into contact with the virtual runway surface without using a landing gear, and thus a shock absorption unit 20 capable of absorbing an impact force may be preferably provided on the landing surface 11 of the aircraft fuselage 1. The shock absorption unit 20 can preferably reduce an impact force that can be generated during fuselage landing as well as an impact force that can be generated when the aircraft fuselage 1 moves at high speed while being continuously brought into contact with an upper surface of the roller constituting a virtual runway surface.

Figure 4:
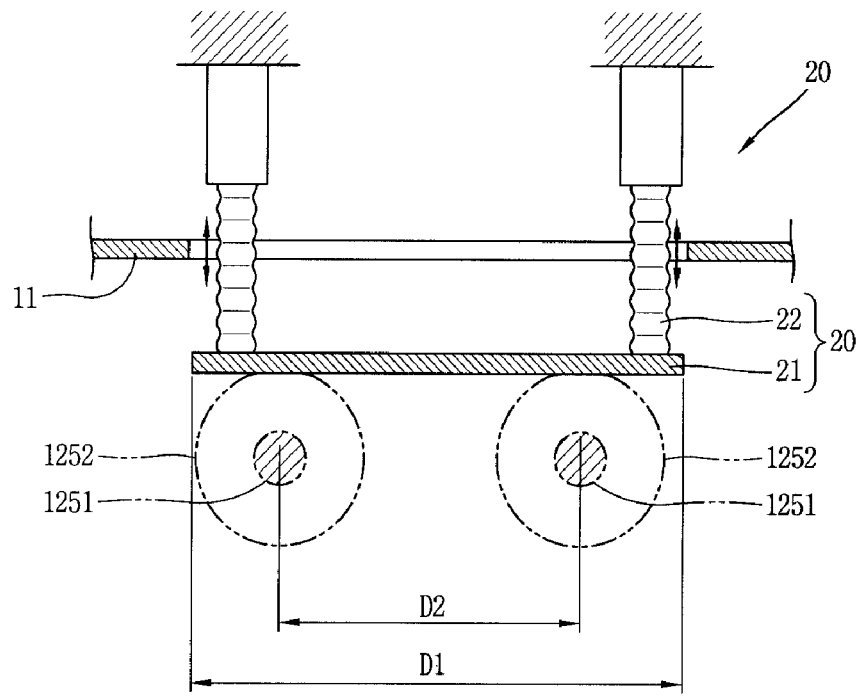
FIG. 4 is a longitudinal cross-sectional view schematically illustrating a configuration in which a shock absorption unit is unfolded, as an enlarged cross-sectional view of a portion "A" in FIG. 3.
Figure 5:
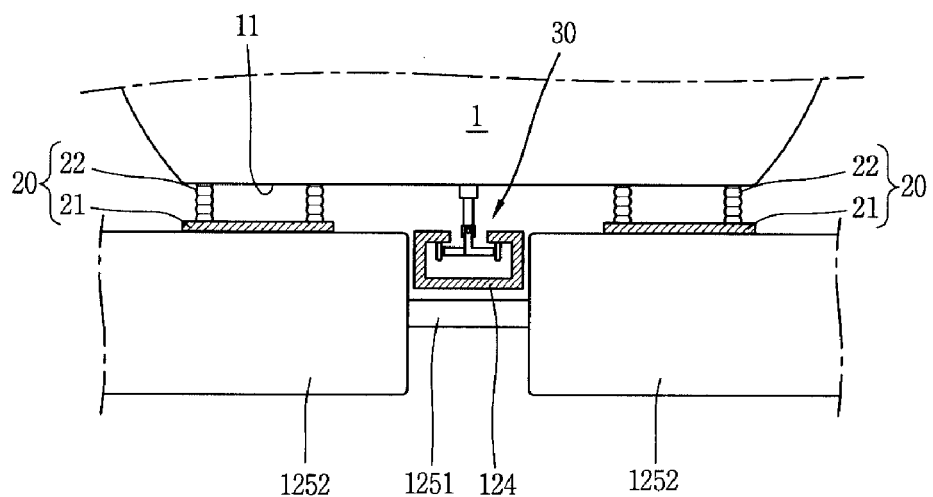
FIG. 5 is a front view schematically illustrating a configuration in which a shock absorption unit in FIG. 4 is unfolded.
Figure 6:
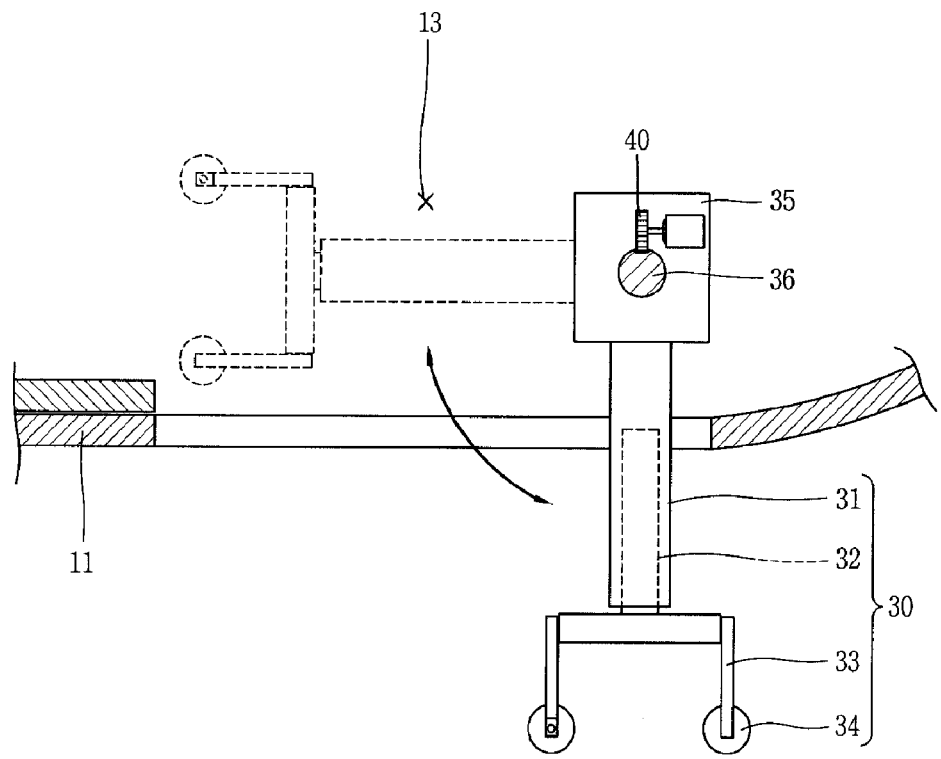
FIG. 6 is a longitudinal cross-sectional view schematically illustrating a configuration in which a rail catcher assembly is unfolded, as an enlarged cross-sectional view of a portion "B" in FIG. 3.
Figure 7:
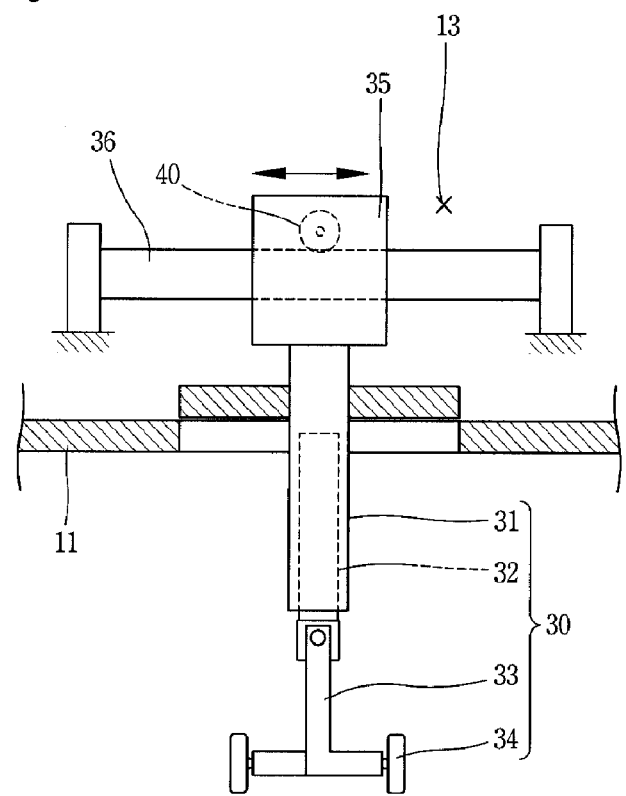
FIG. 7 is a front view schematically illustrating a catcher correction unit in the rail catcher assembly in FIG. 6.

FIG. 3 is a side view illustrating an aircraft according to FIG. 1, and FIG. 4 is a longitudinal cross-sectional view schematically illustrating a configuration in which a shock absorption unit is unfolded, as an enlarged cross-sectional view of a portion "A" in FIG. 3, and FIG. 5 is a front view schematically illustrating a configuration in which a shock absorption unit in FIG. 4 is unfolded, and FIG. 6 is a longitudinal cross-sectional view schematically illustrating a configuration in which a rail catcher assembly is unfolded, as an enlarged cross-sectional view of a portion "B" in FIG. 3, and FIG. 7 is a front view schematically illustrating a catcher correction unit in the rail catcher assembly in FIG. 6.

As illustrated in FIGS. 3 and 4, the shock absorption unit 20 according to the present embodiment may use part of the landing surface 11 of the aircraft fuselage 1 or may be operated in such a manner that a member accommodated within the aircraft fuselage 1 is drawn out during landing.

The shock absorption unit 20 may include an absorption plate 21 slidably brought into contact with the virtual runway surface, and an absorption member 22 provided between the absorption plate 21 and the aircraft fuselage 1 to absorb an impact generated during landing while at the same time allowing the absorption plate 21 to be separated or drawn out from the aircraft fuselage 1. For the absorption member 22, an air bag may be used as illustrated in FIG. 4, but the absorption member 22 may be also made of a shock absorber or the like. The absorption plate 21 will not be limited to only part of the landing surface 11, but will be sufficient if it is a portion forming a bottom surface of the aircraft fuselage 1.

For the absorption plate 21, the entire absorption plate 21 may be preferably formed with a plane by taking a flow resistance during flight into consideration, but a front surface thereof may be also formed with a slightly curved surface to allow the absorption plate 21 to be smoothly slid and glided during drive.

The absorption plate 21 may be preferably formed such that a length (D1) of the absorption plate 21 is greater than a distance (D2) between the roller shafts to the extent that at least two or more rollers 125 are simultaneously brought into contact with one another and supported thereby, to reduce vibration that can be generated when driven over an upper surface of the rollers 125 as illustrated in FIG. 4.

One or a plurality of absorption plates 21 may be provided therein. It may be beneficial in maintaining the left and right balance of the aircraft fuselage 1 that in case of one absorption plate 21, the absorption plate 21 is formed to have an area enough to be placed over both sides of the guide rail 124 which will be described later but in case of a plurality of absorption plates 21, they are disposed around the 124 at both sides of thereof, respectively, as illustrated in FIG. 5.

One or a plurality of absorption members 22 may be provided therein. In case of one absorption member 22, it may be combined with the center of the absorption plate 21 in a tiltable manner in all directions such as forward, backward left and right directions, but in case of a plurality of absorption members 22, they may be provided in a tiltable manner at both left and right sides or in the front/back/left/right of each absorption plate 21, respectively.

Furthermore, the shock absorption unit 20 may be provided at the center of gravity of the aircraft or at a front side from the center of gravity to absorb an impact applied to a front side of the aircraft fuselage 1 during the landing of an aircraft.

Furthermore, an additional fuselage posture correction unit (not shown) may be further provided at the landing surface 11 of the aircraft fuselage 1 other than the shock absorption unit 20. The fuselage posture correction unit may include a posture plate formed in a similar shape to the absorption plate and a correction member configured to elastically support the posture plate to implement correction. The correction member may be provided separately from the absorption member of the shock absorption unit but also may be assembled using a universal joint and the like at the middle of the absorption member. However, it may be preferable in reducing the weight of the aircraft that the absorption member of the shock absorption unit is configured to move in a three-dimensional manner without separately providing the fuselage posture correction unit to always maintain the equilibrium state of the aircraft fuselage.

As illustrated in FIG. 2, at least one or more guide protrusions 12 may be formed in a lengthwise manner on the landing surface 11 of the aircraft fuselage 1 along the runway direction of the aircraft (hereinafter, referred to as a "runway direction"). When a first roller wheel (hereinafter, referred to as a "first roller wheel") 1252 which will be described later is formed of an elastic member having a predetermined thickness such as pneumatic tire or rubber, the guide protrusion 12 can press the first roller wheel 1252, thereby preventing the aircraft from being slid in the left and right direction.

Figure 8:
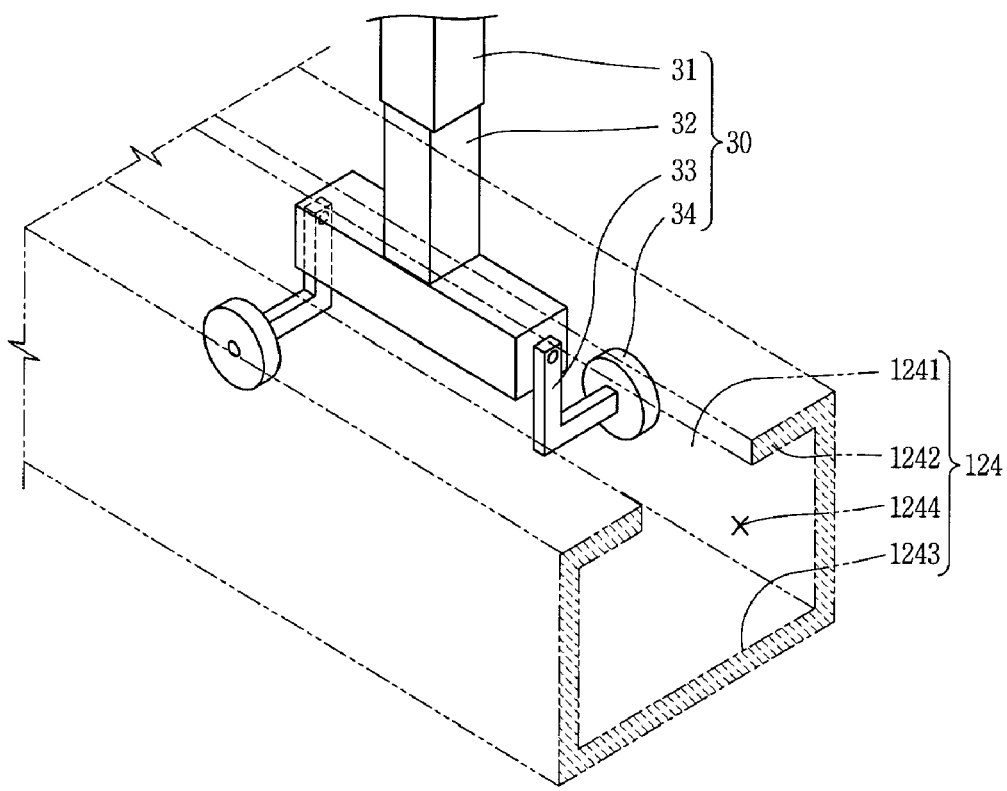
FIG. 8 is a perspective view illustrating schematically illustrating a configuration in which the rail catcher assembly according to FIG. 6 is combined with a guide rail.

As illustrated in FIGS. 6 through 8, at least one or more rail catcher assemblies 30 docked with the guide rail 124 of a runway surface body 120 which will be described later to maintain a central line of movement of the aircraft fuselage 1 may be provided on the landing surface 11 of the aircraft fuselage 1. In case of a plurality of rail catcher assemblies 30, they may be provided with a predetermined interval.

The rail catcher assembly 30 may prevent the aircraft fuselage 1 from being released from the landing position during the landing of the aircraft, and prevent the aircraft fuselage 1 from being shaken or inclined by side wind or wind shear during the landing drive of the aircraft. Furthermore, the rail catcher assembly 30 may prevent the fuselage from being leaned due to unexpected engine stop during takeoff and landing drive.

Here, when the shock absorption unit 20 is provided at a rear side of the landing surface 11 of the aircraft fuselage 1, namely, a portion being bent upward from the landing surface 11, and the aircraft fuselage 1 as illustrated in FIGS. 1, 3 and 6, the rail catcher assembly 30 may be preferably provided at a rear side of the shock absorption unit 20, thereby reducing an impact during landing as well as preventing tail strike in which a lower portion of the rear of the aircraft fuselage 1 is interfered with a virtual runway surface of the runway surface body 120.

The rail catcher assembly 30 may be accommodated into the aircraft fuselage 1 and then docked with the guide rail 124 while being drawn out of the aircraft fuselage 1 during takeoff and landing. To this end, a catcher accommodation space 13 may be formed to accommodate the rail catcher assembly 30 in the aircraft fuselage 1 as illustrated in FIG. 6, and a catcher draw in/out unit (not shown) may be provided in the catcher accommodation space 13 to draw in or out the rail catcher assembly 30 when the takeoff of an aircraft is completed or a landing is attempted. The catcher draw in/out unit may use a hydraulic apparatus or an electromotor and a gear.

The rail catcher assembly 30 may be accommodated in the vertical direction, but the catcher accommodation space 13 may be preferably formed in an elongated manner in a lengthwise direction of the aircraft fuselage 1 such that the rail catcher assembly 30 is laid down in a lengthwise direction to be accommodated therein and then drawn out in an erected state during drawing out in order to minimize the catcher accommodation space 13 as illustrated in FIG. 6. To this end, an end of the rail catcher assembly 30 may be rotatably combined with the aircraft fuselage 1, and the other end of the rail catcher assembly 30 may be combined with a catcher rotation mechanism 35 capable of rotating the rail catcher assembly 30 using an oil or air pressure or a gear.

Furthermore, the rail catcher assembly 30 may be combined with the catcher shaft 36 fixed to the aircraft fuselage 1 in the left and right direction as illustrated in FIGS. 6 and 7, and thus combined with the catcher correction unit 40 such that the rail catcher assembly 30 corrects its own position of the rail catcher assembly 30 while moving in the left and right direction from the catcher shaft when the landing position is deviated in the left and right direction by external conditions such as side wind during the landing of an aircraft. The catcher correction unit 40 may include a gear scheme using an electromotor or hydraulic and pneumatic apparatus to assist the rail catcher assembly by receiving the position of the guide rail 124 in real time while performing bidirectional wireless communication with a sensor provided at the runway surface body which will be described later using information collected by a position sensor, a speed sensor, an altitude sensor, a tilt sensor and the like provided in the aircraft.

The first catcher frame 31 is rotatably combined with the catcher shaft 36 in the catcher accommodation space 13 of the aircraft fuselage 1. The first catcher frame 31 may be made of a material having a high rigidity with a predetermined length. The first catcher frame 31 is combined with an extension mechanism such as a hydraulic or pneumatic cylinder (hereinafter, abbreviated as a "hydraulic and pneumatic cylinder") provided in the aircraft fuselage 1. Furthermore, the first catcher frame 31 may be further provided with another extension mechanism to unfold or restore a second catcher frame 32 which will be described later from the first catcher frame 31 in a lengthwise direction.

The second catcher frame 32 may be inserted and combined to be extended in a lengthwise direction within the first catcher frame 31, and the second catcher frame 32 may be combined with an extension mechanism such as a hydraulic and pneumatic cylinder provided in the first catcher frame 31. The second catcher frame 32 may be further provided with another extension mechanism for rotating a third catcher frame 33 which will be described later to unfold or restore it. The second catcher frame 32 may have a predetermined length, and may be made of a material having a higher rigidity than the weight, and may be formed with an inverse T shape as illustrated in FIG. 6.

The third catcher frames 33 may be rotatably combined with both left and right sides of the lower end of the second catcher frame 32, and each of the third catcher frames 33 may be combined with an extension mechanism provided in the second catcher frame 32. A plurality of third catcher frames 33 may be rotatably combined with both ends of the second catcher frame 32 in opposite directions to each other, respectively, but in this case, each of the third catcher frame 33 may be preferably combined at both ends of the second catcher frame 32, respectively, to be rotated in opposite directions from each other since the catcher wheels 34 which will be described later may be interfered with each other when the third catcher frame 33 is restored.

A catcher wheel 34 restricted to supporting surfaces 1242, 1243 of the guide rail 124 which will be described later while being slidably brought into contact therewith may be rotatably combined with an end of the third catcher frame 33. However, a lubricating member such as a bush bearing and the like may be provided on a supporting surface of the guide rail which will be described later with which an end portion of the third catcher frame 33 is brought into contact instead of the catcher wheel 34 or a lubricant may be supplied to the guide rail to allow the third catcher frame 33 to be directly brought into contact with the guide rail 124.

Here, a plurality of second catcher frames 32 may be formed with multiple stages if circumstances allow. Of course, the second catcher frame 32 may be excluded therefrom to allow the second catcher frame 32 to be directly combined with the second catcher frame 32, but in this case, it may not be preferable that the length of the first catcher frame 31 is lengthened and as a result the catcher accommodation space 13 having a large space is required for the aircraft fuselage 1 to that extent.

Figure 9:
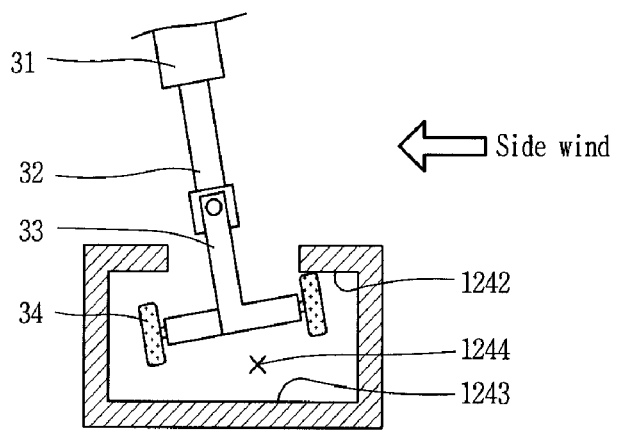
FIG. 9 is a schematic view illustrating the process of allowing the rail catcher assembly according to FIG. 8 to correct a central line of movement of the aircraft on the guide rail.
Figure 9:
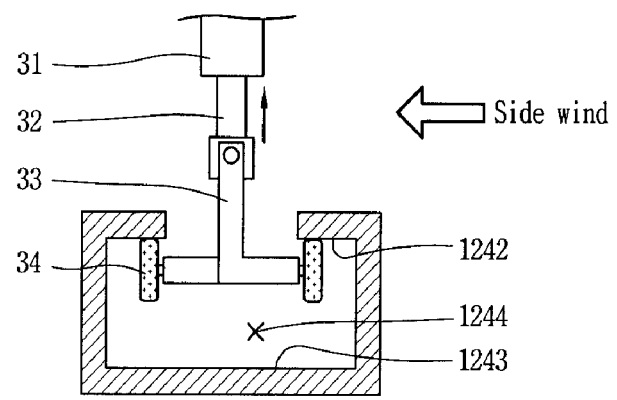
Figure 9:
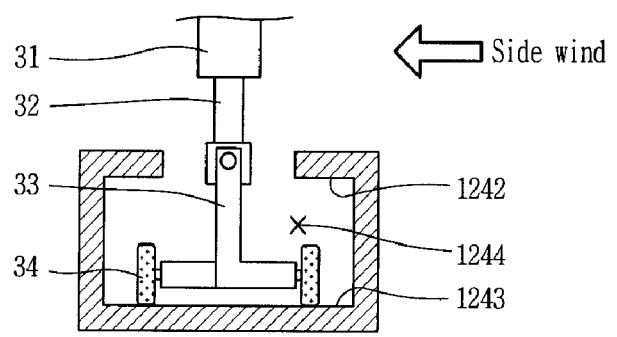

FIG. 8 is a perspective view illustrating schematically illustrating a configuration in which the rail catcher assembly according to FIG. 6 is combined with a guide rail, and FIG. 9 is a schematic view illustrating the process of allowing the rail catcher assembly according to FIG. 8 to correct a central line of movement of the aircraft on the guide rail.

Referring to FIG. 8, when the aircraft fuselage 1 is drawn close to a takeoff and landing guide apparatus 100 and as a result a distance between the rail catcher assembly 30 and the guide rail 124 of the takeoff and landing guide apparatus 100 is less than a predetermined separation distance in the vertical direction, the rail catcher assembly 30 according to the present disclosure moves at high speed along a trajectory of the guide rail 124 while the entire rail catcher assembly 30 is restored toward the catcher accommodation space 13 of the aircraft fuselage 1 by an extension mechanism as much as a predetermined amount in a state that the catcher wheel 34 of the rail catcher assembly 30 is restricted to the guide rail 124. Accordingly, the rail catcher assembly 30 restored into the fuselage as much as a pressure amount set according to a type of the aircraft fuselage 1 draws the guide rail 124 to maintain a pressure drawing the aircraft fuselage 1, thereby preventing the aircraft fuselage 1 from being released or tumbled in the left and right direction from the drive trajectory of the takeoff and landing guide apparatus 100 due to side wind and the like.

Furthermore, it may be sufficient to safely maintain the balance of the aircraft fuselage even with a remarkably low weight compared to the existing main landing gear or front landing gear. In other words, the existing main landing gear or front landing gear may require a lot of weight since an impact load applied at the moment of landing and subsequent upward force continues to be reduced and a load (dynamic load due to high speed movement) received by gravity continues to be received until landing is completed, and a load as much as the aircraft and a weight on board continues to be exerted.

On the contrary, the rail catcher assembly 30 according to the present embodiment may receive only a force for coping with an unexpected gust circumstance or the like that can occur when the landing surface 11 of the aircraft fuselage 1 is placed and driven on the virtual runway surface during no wind landing.

Furthermore, when landing is performed in circumstances such as discontinuous strong side wind, wind shear or the like, the landing surface 11 of the aircraft fuselage 1 is brought into contact with the virtual runway surface 102 of the takeoff and landing guide apparatus 100 from a time point when the rail catcher assembly 30 has been inserted into the guide rail 124, and the rail catcher assembly 30 supports the aircraft fuselage 1 while the catcher wheel 34 of the rail catcher assembly 30 is repetitively grounded on the upper supporting surface 1242 and lower supporting surface 1243 of the guide rail 124. Then, until upward force of the aircraft is gradually decreased while the landing surface 11 of the aircraft fuselage 1 is landed and driven on the virtual runway surface 102 of the takeoff and landing guide apparatus 100 and stopped while the aircraft is gradually governed by the weight of the fuselage, the catcher wheel 34 of the rail catcher assembly 30 is grounded only on the upper supporting surface 1242 of the guide rail 124 to receive only a force for coping with an unexpected gust circumstance or the like.

Furthermore, the rail catcher assembly 30 holds the guide rail 124 while the aircraft stays on the ground and thus receives only a force for coping with tumbling due to an external force such as side wind or the like.

Accordingly, compared with the main landing gear or front landing gear of the existing aircraft, a design strength (load) of the rail catcher assembly 30 according to the present embodiment is designed with a very low strength compared to the load sustained by the main landing gear or front landing gear of the existing aircraft, and thus the aircraft fuselage 1 may be sufficiently supported even with a relatively very low weight.

Figure 10:
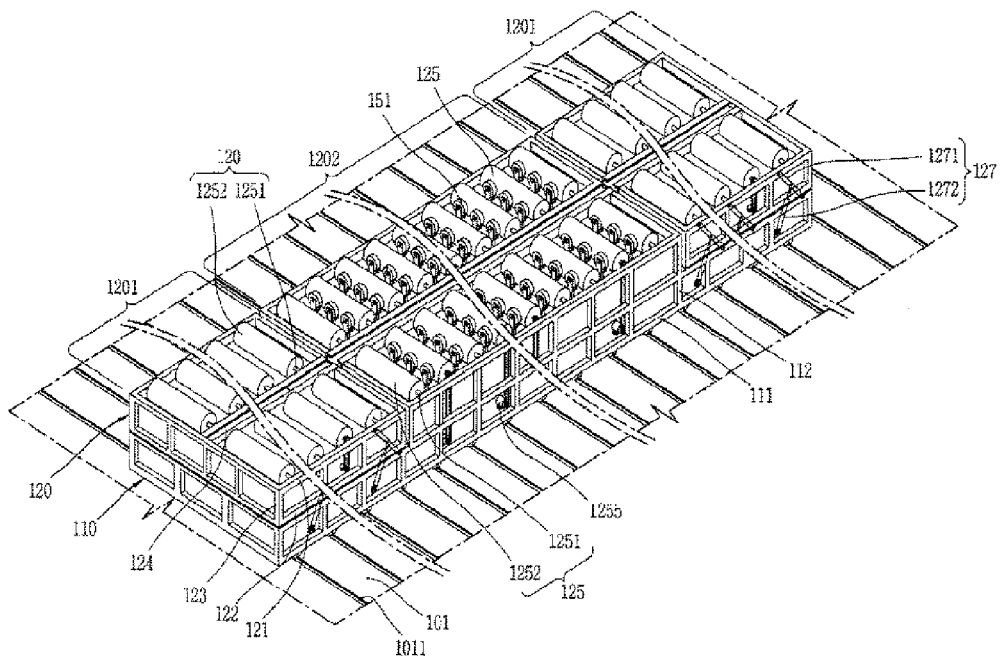
FIG. 10 is a top perspective view illustrating a takeoff and landing apparatus according to the present disclosure.
Figure 11:
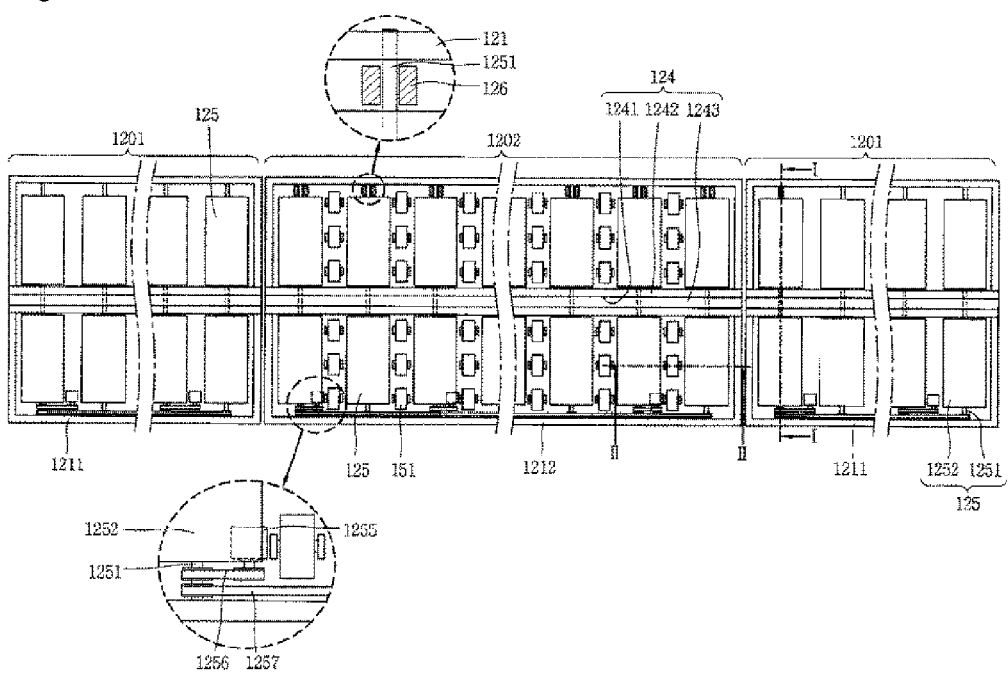
FIG. 11 is a plan view illustrating a takeoff and landing apparatus according to FIG. 10.
Figure 12:
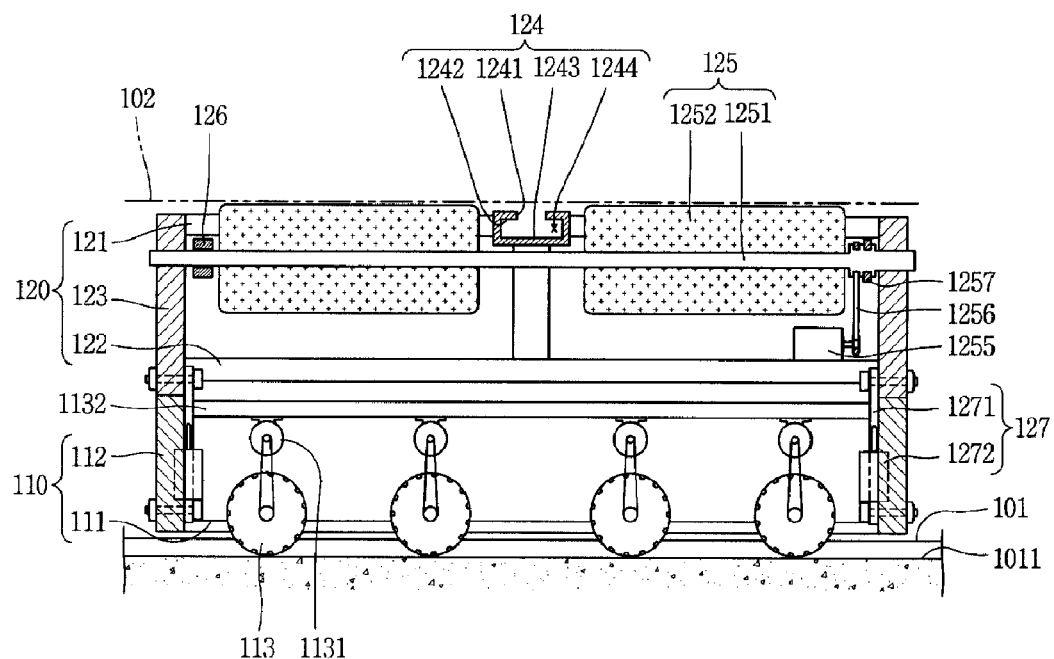
FIG. 12 is a cross-sectional view taken along line "I-I" in FIG. 11.
Figure 13:
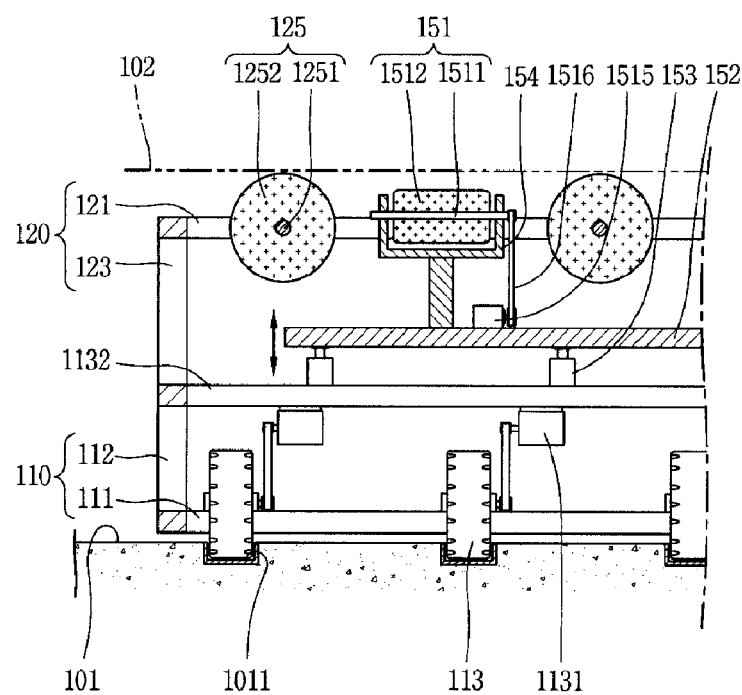
FIG. 13 is a cross-sectional view taken along line "II-II" in FIG. 11.
Figure 14:
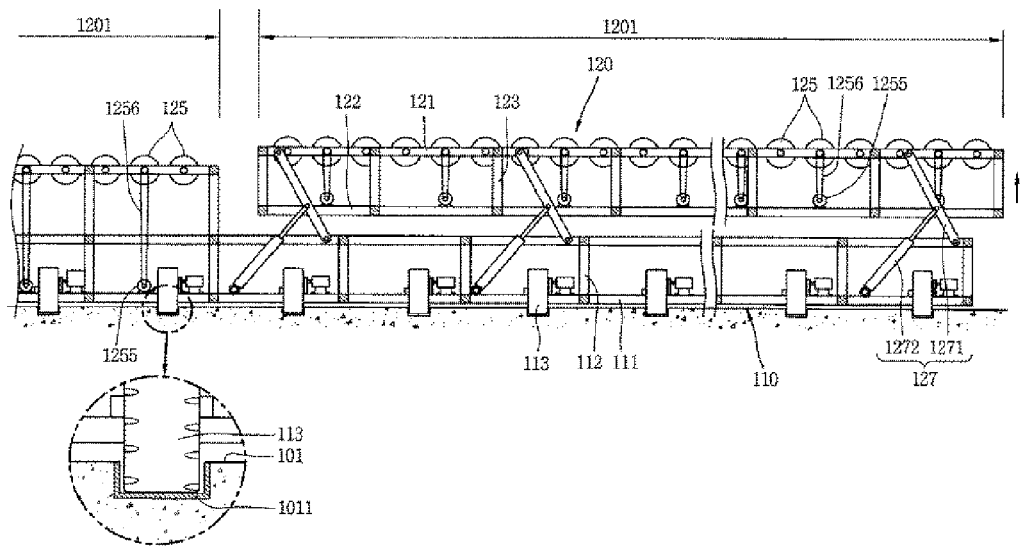
FIGS. 14 and 15 are side views illustrating an elevation state of the runway surface body for takeoff and landing in FIG. 11, respectively.
Figure 15:
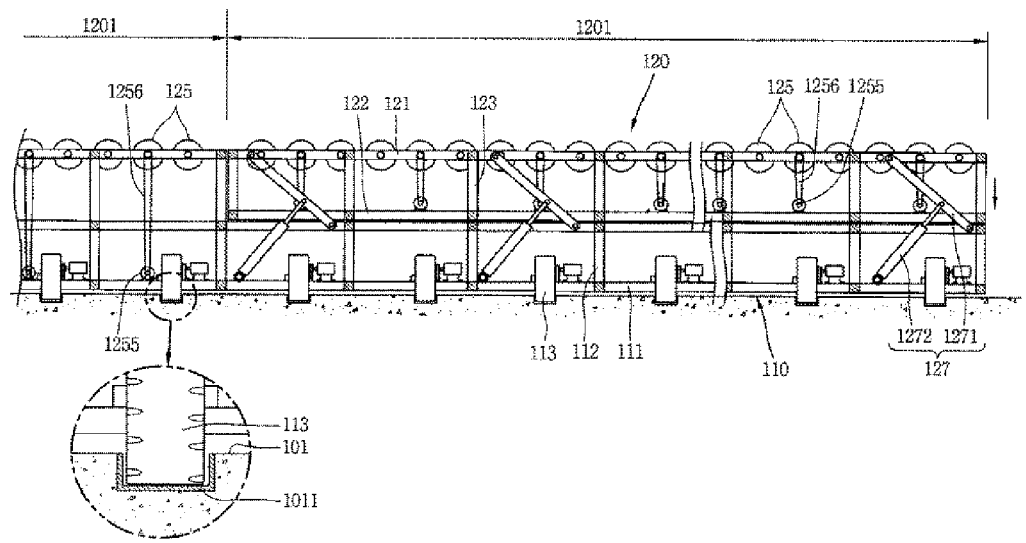

FIG. 10 is a top perspective view illustrating a takeoff and landing apparatus according to the present disclosure, and FIG. 11 is a plan view illustrating a takeoff and landing apparatus according to FIG. 10, and FIG. 12 is a cross-sectional view taken along line "I-I" in FIG. 11, FIG. 13 is a cross-sectional view taken along line "II-II" in FIG. 11, and FIGS. 14 and 15 are side views illustrating an elevation state of the runway surface body for takeoff and landing in FIG. 11, respectively.

The takeoff and landing guide apparatus 100 according to the present embodiment may be installed on the runway surface body 120 having a virtual runway surface 102 at an upper side of the supporting body 110 installed on the runway ground 101 of an air field in a fixed manner or installed in a movable manner as illustrated in FIGS. 10 and 11.

The supporting body 110 may be configured with a plurality of frames connected to one another, and formed with a structure having a rigidity capable of sufficiently supporting the runway surface body 120 and the aircraft. For example, as illustrated in FIG. 10, the supporting body 110 according to the present embodiment may be provided with a plurality of side frames 112 having a predetermined height at an upper surface of the lower frame 111. The lower frame 111 is formed in an elongated manner as long as the length of a runway, and the side frames 112 may be installed in the vertical direction at an edge of the lower frame 111 or between the edges with a predetermined interval. An absorption member (not shown) allowing the runway surface body 120 to absorb an impact force during landing may be provided at an upper end of the side frames 112. However, it may be sufficient that the supporting body 110 has a structure with a rigidity capable of safely supporting the runway surface body and the aircraft in addition to the foregoing structure.

As illustrated in FIG. 12, a first roller motor 1255 for driving a first roller 125 installed on the runway surface body 1201 which will be described later may be provided on the lower frame 111 of the supporting body 110.

As illustrated in FIGS. 10 and 11, the runway surface body 120 may be formed in a shape that can be placed on an upper surface of the supporting body 110. For example, the runway surface body 120 may be formed with a runway frame 121 with a size substantially similar to the lower frame 111 of the supporting body 110, and a mounting frame 122 placed on the side frames 112 of the supporting body 110 with a predetermined interval may be formed at a lower portion of the runway frame 121. The runway frame 121 and mounting frame 122 are formed with a substantially similar shape and combined with a side frame 123.

A plurality of rollers for takeoff and landing 125 (hereinafter, abbreviated as "first rollers") constituting the virtual runway surface 102 may be combined with an inner surface of the runway frame 121 with a predetermined interval in a lengthwise direction. The runway frame 121 may be formed in an elongated manner as long as a length substantially required for the takeoff of an aircraft in the runway direction of the aircraft (hereinafter, interchangeably used with a lengthwise direction). However, the existing aircraft is taken off only by a thrust of the aircraft whereas the aircraft is taken off using a thrust of the aircraft together with a frictional force generated from the first roller 125 of the takeoff and landing guide apparatus 100 according to the present embodiment, and as a result, the required runway length may be drastically reduced compared to the existing runway.

Furthermore, the width length of the runway frame 121 may be formed in a different manner according to the aircraft. For example, when the aircraft is a low wing type or the engine is installed at a lower side of the wing, the width length of the runway surface body 120 may be preferably formed to be less than a distance between both engines of the minimum rated aircraft among aircrafts being developed to use the takeoff and landing guide apparatus 100 so that the main wing or engine of the aircraft may not be caught in the runway surface body 12. However, when the aircraft is a high wing type, the main wing or engine may not be caught in the runway surface body 120 and thus the width length of the runway surface body 120 may not be necessarily limited.

As illustrated in FIGS. 11 and 12, the first roller 125 may include a roller shaft for takeoff and landing (hereinafter, abbreviated as a "first roller shaft") 1251 rotatably combined with the runway frame 121, and a roller wheel (hereinafter, abbreviated as a "first roller wheel") 1252 combined with the first roller shaft 1251 to form the virtual runway surface 102.

The first roller shaft 1251 may be merely rotatably combined with the runway frame 121, but also may be mechanically combined with a rotation shaft of the motor for driving the roller for takeoff and landing provided with an inverter motor such that the first roller 125 is rotated in interlock with the speed required for the takeoff and landing of the aircraft during the takeoff and landing of the aircraft. The rotation speed of the first roller motor 1255 may be synchronized with an entry speed of the aircraft and thus automatically implemented by a real-time interlock operation through a variable frequency control of the inverter motor.

The first roller motor 1255 may be fixed and combined with the mounting frame 122 of the runway surface body 120 to be mechanically connected to the first roller shaft 1251. The first roller motor 1255 may be connected to a plurality of first rollers 125 in an independent manner, but also may be connected to a plurality of first rollers 125 in an integrated manner using the electromotive member 1256 as illustrated in FIG. 11.

The first roller motor 1255 may always generate a driving force, but the first roller motor 1255 at a portion where power is not required allows idle rotation to reduce unnecessary power consumption. Furthermore, the first roller motor 1255 may convert kinetic energy into thermal energy when braking the aircraft fuselage 1 to apply an energy storage system (ESS) for surplus kinetic energy through a motor regenerative braking control while controlling the speed of the aircraft, thereby enhancing energy efficiency.

A plurality of first rollers 125 may be bundled using an electromotive member to drive the plurality of first rollers 125 in an independent manner from one another, but all the first rollers 125 of the runway surface body for takeoff and landing 1201 and all the first rollers 125 of the runway surface body for run 1202 may be preferably bundled with one electromotive member 1257, respectively, to drive all the first rollers 125 of the runway surface body for takeoff and landing 1201 at the same time and drive all the first rollers 125 of the runway surface body for run 1202 at the same time, thereby generating a high driving force.

As illustrated in FIGS. 11 and 12, a roller braking unit 126 for forcibly braking the first roller shaft 1251 may be combined with one end or both ends of the first roller shaft 1251 at a side of the first roller motor 1255. The roller braking unit 126 may be preferably electrically connected to the first roller motor 1255 and controlled in interlock therewith, thereby preventing unnecessary energy consumption.

The first roller 125 may be combined with a first roller wheel 1252 having a long length on the first roller shaft 1251 or combined with a plurality of first roller wheels 1252 having a short length with a predetermined interval. The first roller wheel 1252 may be made of a pneumatic tire to elastically support the aircraft or made of an elastic material having a predetermined thickness such as rubber.

A protrusion or groove may be formed at an outer circumferential surface of the first roller wheel 1252 to enhance a frictional force to the aircraft fuselage 1. Furthermore, a heating wire (not shown) may be embedded in the first roller shaft 1251 and first roller wheel 1252 to remove snow piled up on the roller when snows.

As illustrated in FIGS. 8, 10 through 12, a guide rail 124 may be combined with the middle of the first roller shaft 1251, i.e., between the first roller wheels 1252, such that the rail catcher assembly 30 of the aircraft fuselage 1 is inserted and docked along the runway direction.

The guide rail 124 may be formed in a vacant rectangular pipe shape to have a space portion 1244 in which the catcher wheel 34 of the rail catcher assembly 30 is inserted and unfolded in both directions. Furthermore, an upper surface of the guide rail 124 may be formed with an opening portion 1241 into which the third catcher frame 33 and catcher wheel 34 of the rail catcher assembly 30 can be inserted, as well as an upper supporting surface 1242 and a lower supporting surface 1243, respectively, may be formed at both left and right sides of the opening portion 1241 and lower sides thereof corresponding to them such that when the third catcher frame 33 is unfolded in both directions on the guide rail 124 the catcher wheel 34 combined with the third catcher frame 33 is restricted to support the aircraft in the up/down/left/right directions. A bearing member (not shown) such as a bush bearing may be combined with an inner circumferential surface of the upper supporting surface 1242 and lower supporting surface 1243, respectively, according to circumstances.

The guide rail 124, though not shown in the drawing, may be formed in a shape that the supporting surface is protruded toward both left and right sides, like a "I" shape. In this case, the third catcher frame 33 of the rail catcher assembly 30 may be configured to be unfolded toward the inside, contrary to the foregoing embodiment. In this case, a pliers-shaped clamper (not shown) may be provided at an end portion of the third catcher frame 33 to hold the supporting surface, thereby restricting the aircraft.

As illustrated in FIGS. 10, 14 and 15, the runway surface body 120 may be further provided with a runway surface elevation unit (hereinafter, referred to as a "first elevation unit) 127 to move the virtual runway surface 102 in the upward and downward direction, thereby reducing an impact when the aircraft fuselage 1 is landed.

The first elevation unit 127 may include a plurality of connecting frames 1271 link-combined between the lower frame 111 of the supporting body 110 and the mounting frame 122 of the runway surface body 120, and a plurality of elevation mechanisms 1272 installed on the lower frame 111 of the supporting body 110 to rotatably press the connecting frames 1271 so as to move the runway surface body 120 in the upward and downward direction. However, for the first elevation unit 127, an elevation mechanism (not shown) is directly installed at the lower frame or side frame of the supporting body without using an additional connecting frame and the mounting frame 122 of the runway surface body 120 is combined with the elevation mechanism, thereby allowing the runway surface body 120 to be elevated while the elevation mechanism exerts an elevation force in the upward and downward direction. A hydraulic cylinder may be typically applied to the elevation mechanism, but a pneumatic cylinder may be also applied thereto since the runway surface body 120 is elevated prior to the landing time point of the aircraft and then slowly moves downward while being synchronized with the landing speed of the aircraft.

Furthermore, the first elevation unit 127 may be implemented using a hydraulic apparatus, but various implementation schemes capable of elevating the runway surface body such as a joint frame may be applicable thereto according to circumstances.

The runway frame 121 may be implemented as a single unit and thus the entire runway surface body 120 may be controlled to be moved in the upward and downward direction or in the left and right direction. However, the runway frame 121 may be also divided into a plurality of sections according to the takeoff and landing progress and thus only necessary portions thereof may be controlled to be moved in the upward and downward direction or in the left and right direction.

For example, as illustrated in FIGS. 10 and 11, when the runway frame 121 is divided into a plurality of sections, the runway frame 1211 of the runway surface body for takeoff and landing 1201 in the section located at both ends may be combined and elevated with the first elevation unit 127 whereas the runway frame 1212 of the runway surface body for takeoff and landing 1202 located between both runway surface bodies for takeoff and landing 1201, 1201 may be fixed and combined with the first elevation unit 127.

The supporting body 110 may be fixed and installed on the ground, but also a plurality of wheels for runway transportation (hereinafter, abbreviated as a "first transport wheel") 113 may be provided at the supporting body 110 such that the supporting body 110 and runway surface body 120 can move in the left and right direction in interlock with the movement of the aircraft by the landing position correction unit 140 which will be described later.

As illustrated in FIGS. 12 and 13, the first transport wheel 113 may be rotatably combined with the lower frame 111 of the supporting body 110 to move the takeoff and landing guide apparatus 100 including the supporting body 110 and the runway surface body 120 in a direction perpendicular to the takeoff and landing direction of the aircraft, and the first transport wheel 113 may be combined with the rotation shaft of a motor for driving the first wheel 11271 (hereinafter, referred to as a "first wheel motor") fixed to an additional motor frame 11272 provided at the lower frame 111 or side frame 112 of the supporting body 110 or the supporting body 110. The first wheel motor 11271 may be provided for each of the first transport wheels 113 in an independent manner as in case of the first roller 125, but a plurality of first transport wheels 113 may be also integrated and connected to one first wheel motor 11271 using an electromotive member (not shown).

The first transport wheel 113 may move on the ground 101 in a free state. However, taking the weight of the aircraft or the weight of the takeoff and landing guide apparatus 100 into account, the movement rail 1011 having a predetermined depth, namely, a depth that can be moved in a state that the first transport wheel 113 is inserted therein, may be preferably embedded in the ground 101 to move the takeoff and landing guide apparatus 100 in a predetermined direction.

Here, an upper end surface of the movement rail 1011 may be preferably formed to have a substantially same height as the ground 101, thereby reducing the cost according to runway replacement. In other words, when the movement rail is embedded in the existing air field runway, it may be possible to perform the takeoff and landing of an aircraft with wheels using the existing runway as well as to perform the takeoff and landing of an aircraft in which the takeoff and landing system according to the present disclosure is applied to the existing runway to allow takeoff and landing. Accordingly, the movement rail may be embedded in the existing runway and thus the runway may be used as the need arises, thereby reducing the cost for installing the takeoff and landing apparatus according to the present disclosure.

On the other hand, the landing position correction unit may be further provided between the aircraft and the takeoff and landing system of the aircraft according to the present disclosure to vary the position of the takeoff and landing apparatus according to the landing expected position of the aircraft or vary the landing expected position of the aircraft. Various aviation technologies may be applicable to the landing position correction unit.

Figure 16:
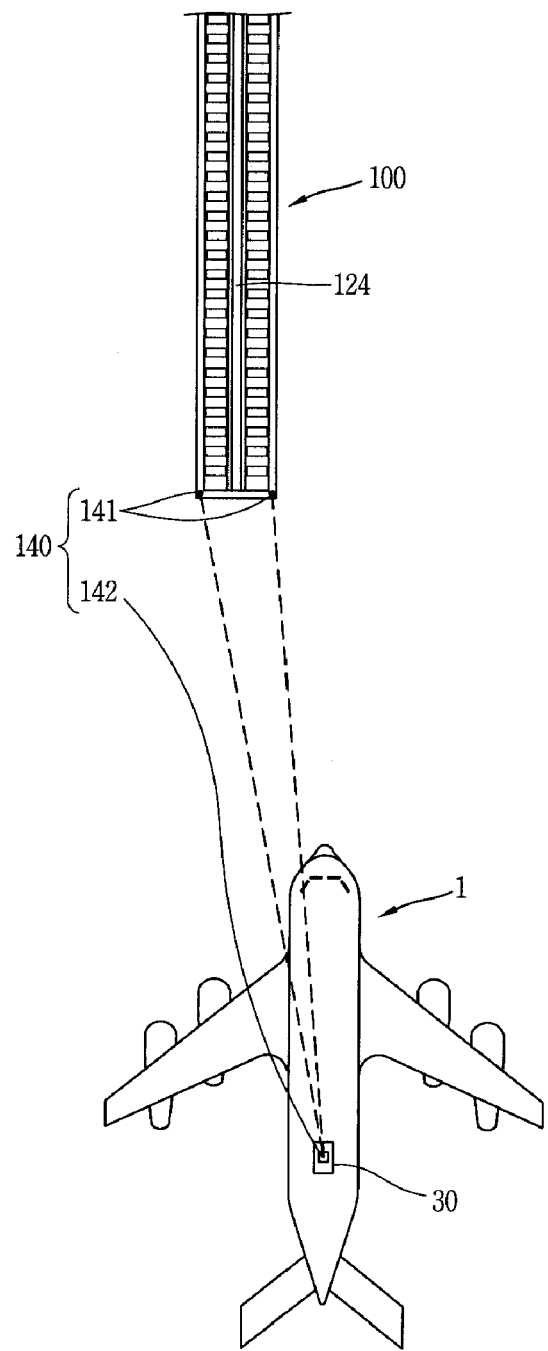
FIG. 16 is a schematic view illustrating a position correction unit between the aircraft and the takeoff and landing guide apparatus according to the present disclosure.

FIG. 16 is a schematic view illustrating a position correction unit between the aircraft and the takeoff and landing guide apparatus according to the present disclosure. As illustrated in FIG. 16, according to the present embodiment, first position sensors 141, 141 may be provided at both left and right directional ends of the takeoff and landing guide apparatus 100, and a second position sensor 142 may be provided at the center of the aircraft fuselage 1, i.e., the rail catcher assembly 30. The first position sensors 141, 141 and the second position sensor 142 may communicate each other to guide the rail catcher assembly 30 of the aircraft fuselage 1 and the guide rail 124 of the takeoff and landing guide apparatus 100 to be safely docked with each other while controlling the landing expected position of the aircraft fuselage 1 or controlling the position of the takeoff and landing guide apparatus 100. In this case, the first position sensor 141, 141 may be preferably installed at both left and right sides with the same distance around the guide rail 124.

In addition, an equipment to which microwave explorer principles, namely, explorer technologies for anti-ship anti-air missile for detecting and tracking a target using microwave electromagnetic waves, and the like are applied may be applicable thereto. Furthermore, a scheme in which cameras are installed at predetermined both end positions to track the rail catcher of the aircraft being landed in real time and correct an image error in real time, and the like may be applicable thereto.

The process of allowing an aircraft to perform takeoff and landing in a takeoff and landing system of the aircraft according to the present embodiment as illustrated in the above will be described below.

First, considering the takeoff process, the first roller 125 of the takeoff and landing guide apparatus 100 is rotated by a rotational force of the first roller motor 1255 while at the same time the aircraft engine starts to operate in a state that the aircraft fuselage 1 is placed on the first roller 125 of the runway surface body 120. Then, the aircraft is slid and driven on the first roller 125 of the takeoff and landing guide apparatus 100 constituting the virtual runway surface 102 using a thrust of the aircraft engine and a frictional force of the first roller 125 by a rotational force of the first roller motor 1255.

Then, the aircraft unfolds a spoiler of the main wing or the like to run for a predetermined period of time or predetermined distance while maintaining a takeoff suppression mode.

Then, when reaching the takeoff speed or exceeding the takeoff speed, the aircraft is taken off by folding the spoiler and manipulating a flap or the like while separating the rail catcher assembly 30 from the guide rail 124 to float the front surface of the aircraft.

At this time, the rail catcher assembly 30 stably runs without the aircraft being inclined or tumbled in the left and right direction by side wind or the like as the third catcher frame 33 maintains the state of being unfolded on the left and right within the guide rail 124 prior to reaching the takeoff speed. Furthermore, the third catcher frame 33 and second catcher frame 32 of the rail catcher assembly 30 are separated from the guide rail 124 while being sequentially restored to prepare takeoff just prior to reaching the takeoff speed or just prior to exceeding the takeoff speed to perform takeoff.

Figure 17:
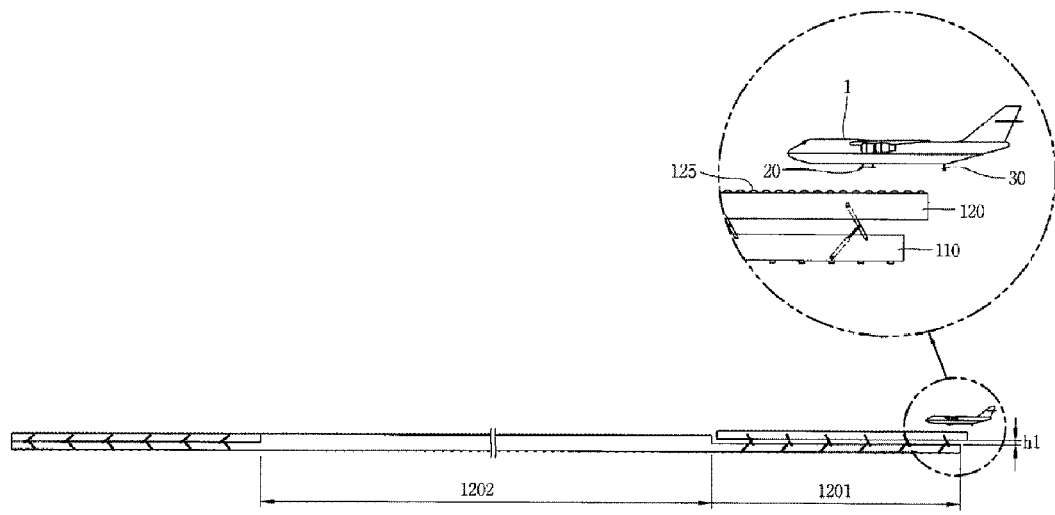
FIGS. 17 through 19 are schematic views illustrating a process in which an aircraft according to the present disclosure is landed on the takeoff and landing guide apparatus.

On the contrary, the landing process will be described with reference to FIGS. 17 through 19. In other words, as illustrated in FIG. 17, the first elevation unit 127 of the runway surface body for takeoff and landing 1201 located at an expected position at which the aircraft is to be landed is operated to move the runway surface body 1201 in the vertical direction up to a predetermined height (h1). At this time, the first catcher frame 31 and second catcher frame 32 of the rail catcher assembly 30 are unfolded and prepared to be docked with the guide rail 124 of the runway surface body for takeoff and landing 1201, and at the same time, when the shock absorption unit 20 is provided therein, the absorption plate 21 of the shock absorption unit 20 is unfolded from the aircraft fuselage 1 by the absorption member 22 and prepared to absorb a collision force with the first roller 125. Moreover, the takeoff and landing guide apparatus 100 corrects an accurate landing position in real time while being moved in the left and right direction according to the landing expected position of the aircraft.

Figure 18:
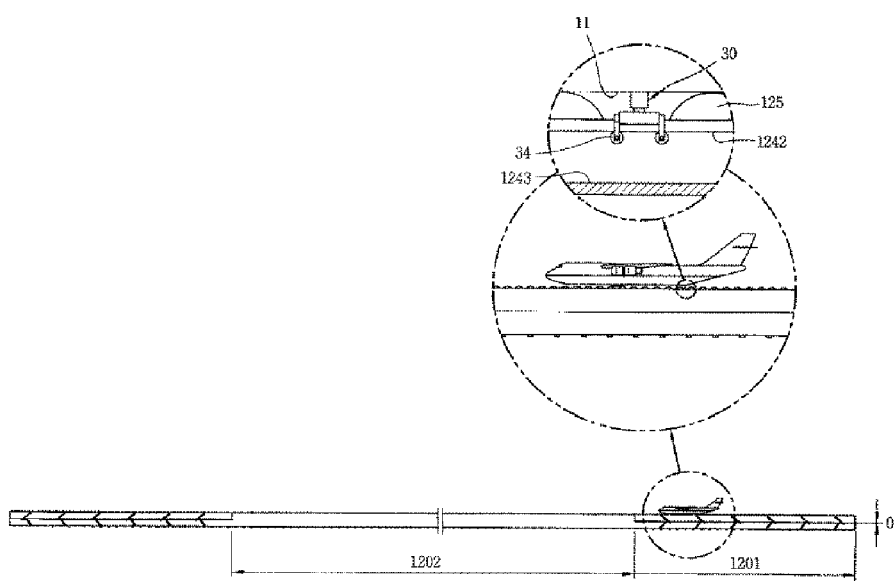

Then, as illustrated in FIG. 18, the landing surface 11 of the aircraft fuselage 1 is landed on the first roller wheel 1252 of the runway surface body for takeoff and landing 1201 while the guide rail 124 of the aircraft fuselage 1 is inserted and docked with the guide rail 124 of the runway surface body for takeoff and landing 1201. At this time, the first elevation unit 127 performs the landing of an aircraft in a safe manner while gradually lowering the runway surface body for takeoff and landing 1201 according to the landing speed of the aircraft fuselage from a time point when the landing surface 11 of the aircraft fuselage 1, more particularly, the absorption plate 21 of the shock absorption unit 20, is brought into contact with the first roller wheel 1252 of the relevant runway surface body for takeoff and landing 1201.

Here, an X-axis angle displacement (left and right directional displacement) of the aircraft fuselage 1 may be generated by an effect of side wind or the like when the aircraft fuselage 1 approaches the virtual runway surface 102 of the runway surface body for takeoff and landing 1201. In this case, the first elevation unit 127 at one side line between the first elevation units 127 elevates the runway surface body for takeoff and landing to correspond to a displacement angle of the aircraft fuselage 1, thereby displacing the virtual runway surface 102 in real time in such a manner that the virtual runway surface 102 is in parallel to the aircraft fuselage 1. At this time, when landing is attempted in a state that the aircraft fuselage 1 is inclined, the rail catcher assembly 30 of the aircraft fuselage 1 holds the guide rail 124 as illustrated in FIG. 9 and thus the first elevation unit 127 at the side where the left and right directional displacement with respect to the Z-axis direction (i.e., the runway direction of the aircraft) is larger just subsequent to landing on the virtual runway surface 102 quickly initiates the descent operation in a preferential manner, whereas the first elevation unit 127 at the side where the displacement is smaller provides a delay time to equalize the operation height of the first elevation units 127 at both sides, thereby allowing the first elevation unit 127 to be synchronized with the landing speed of the aircraft to perform automatic control. Moreover, the runway surface body for takeoff and landing is continuously descended by the first elevation unit 127 and the runway surface body for takeoff and landing 1201 is descended to a height (h=0) same as the runway surface body for run 1202 before the aircraft completely passes through the runway surface body for takeoff and landing 1201.

Figure 19:
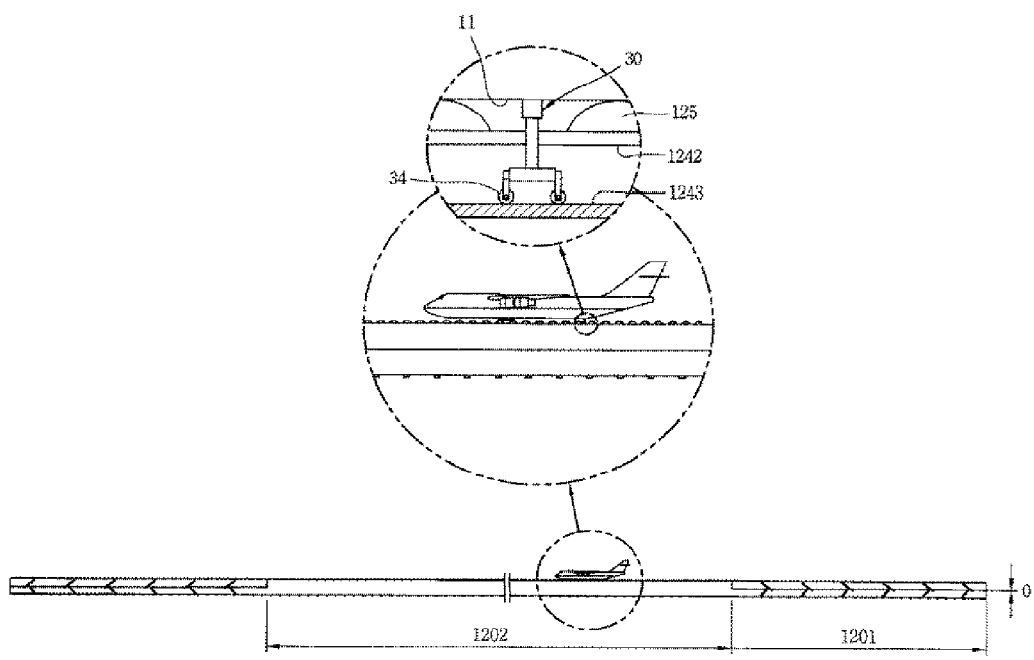

Then, as illustrated in FIG. 19, the aircraft enters the runway surface body for takeoff and landing 1201 at the speed of about 250-300 km/hr (about 70-84 m/s) and passes through the runway surface body for takeoff and landing 1201 over about 200-300 m and then enters the runway surface body for run 1202. On the runway surface body for run 1202, the aircraft is stopped at a predetermined position while the rotation speed of the first roller 125 is continuously decreased by reducing the speed of the first roller motor 1255 and operating the roller braking unit 126.

At this time, the catcher wheel 34 is slid and driven in the state of being restricted to the upper supporting surface 1242 or lower supporting surface 1243 of the guide rail 124 while the second catcher frame 32 is restored in a state that the third catcher frame 33 of the rail catcher assembly 30 inserted into the guide rail 124 is unfolded in both directions, and thus the aircraft can perform landing run in a safe manner without being inclined or tumbled even during a sudden environmental change such as side wind.

Figure 20:
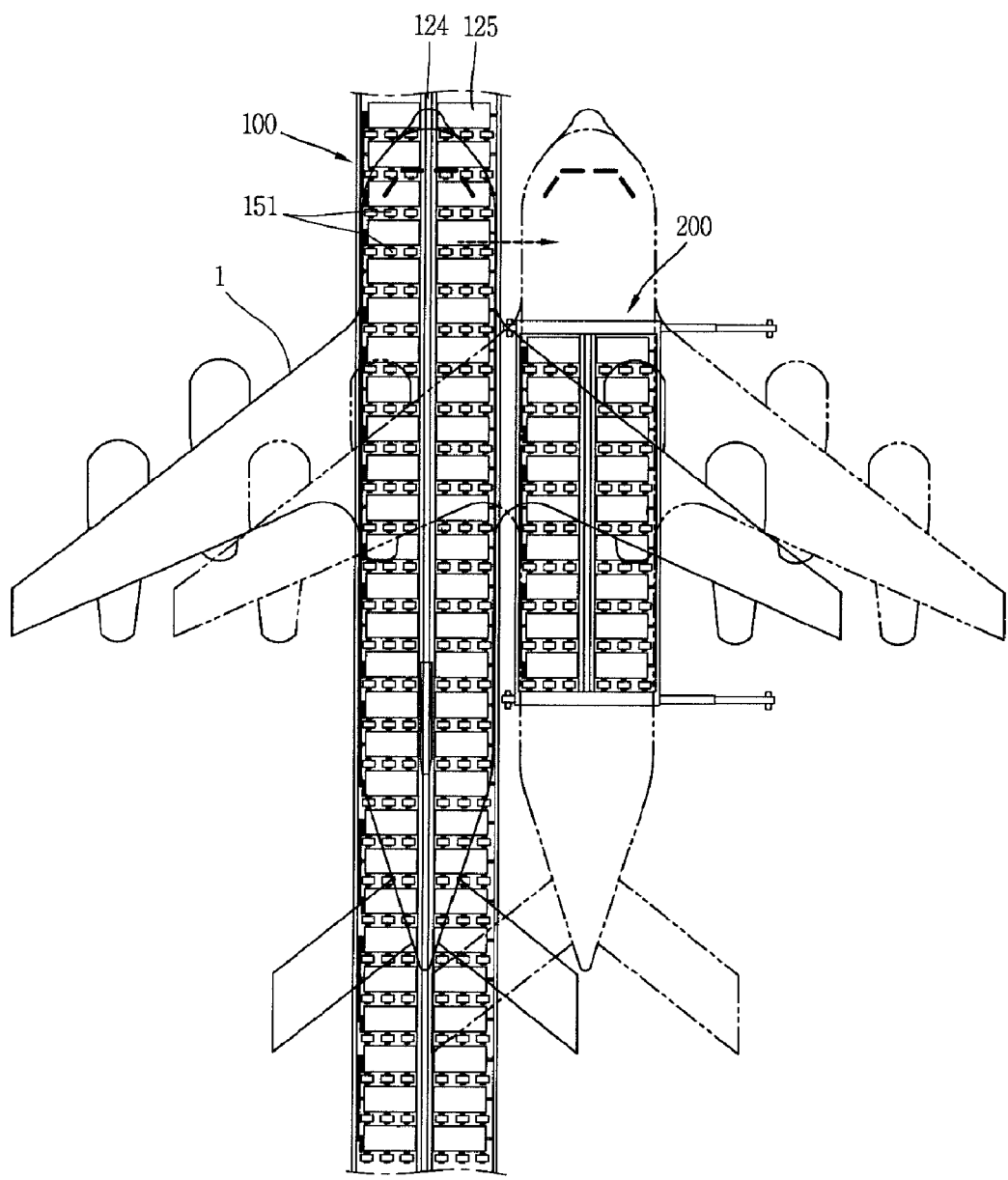
FIG. 20 is a plan view illustrating the process of transferring an aircraft using a transport carriage in the takeoff and landing guide apparatus according to the present disclosure.
Figure 21:
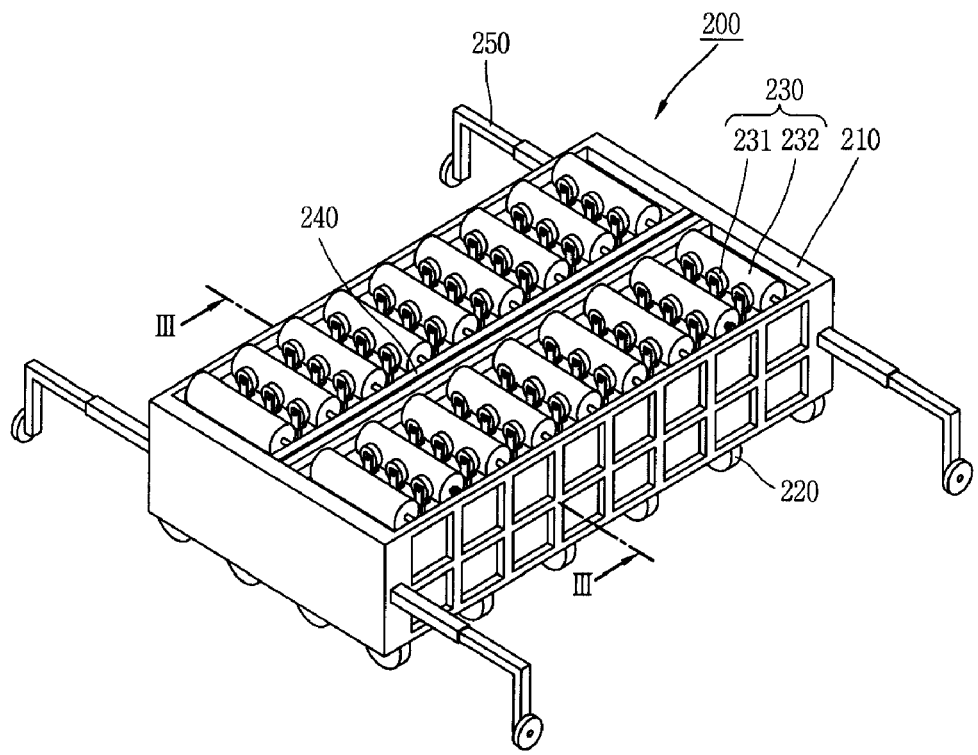
FIG. 21 is a perspective view illustrating a transport carriage according to FIG. 20.
Figure 22:
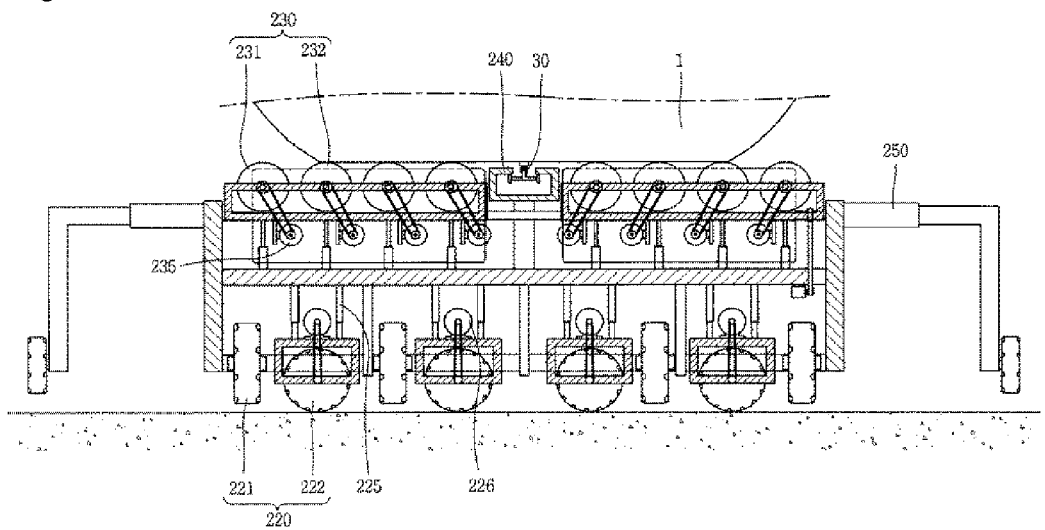
FIG. 22 is a front longitudinal cross-sectional view illustrating a transport carriage, as a cross-sectional view taken along line "Ill-Ill" in FIG. 21.

On the other hand, a transfer unit for transferring the aircraft fuselage from the takeoff and landing guide apparatus to the transport carriage which will be described later may be further provided on the runway surface body. FIG. 20 is a plan view illustrating the process of transferring an aircraft using a transport carriage in the takeoff and landing guide apparatus according to the present disclosure, and FIG. 21 is a perspective view illustrating a transport carriage according to FIG. 20, and FIG. 22 is a front longitudinal cross-sectional view illustrating a transport carriage, as a cross-sectional view taken along line "III-III" in FIG. 21.

The transfer unit 150 according to the present embodiment may be provided in the middle of the runway surface body 120 as illustrated in FIG. 20. Accordingly, the transfer unit 150 according to the present embodiment may transport the aircraft in a direction perpendicular to the runway direction to transfer it to the transport carriage 200. Of course, without providing a separate transfer unit, the transport carriage 200 may be disposed at an end of the takeoff and landing guide apparatus 100 to receive the aircraft being transferred to the end of the runway surface body 120 while being mounted on the first roller 125 of the runway surface body 120 in the runway direction and transfer it to the transport carriage 200. However, in this case, the aircraft should be transferred to the end of the runway surface body 120 even in case where the runway length is short according to a kind of the aircraft, and thus unnecessary power may be consumed and transfer time may be excessively required.

As illustrated in FIGS. 10 and 11, the transfer unit 150 may be preferably installed on the runway surface body for run 1202 since the aircraft is mainly transferred on the runway surface body for run 1202. The transfer unit 150 may be installed over the entire runway surface body 120.

The transfer unit 150 may be implemented by providing a roller for transfer (hereinafter, abbreviated as a "second roller") 151 being rotated in a direction perpendicular to the rotation direction of the first roller 125 between the first roller 125 as illustrated in FIG. 13.

The second roller 151 may be combined with the transfer frame 152 provided at an inner side of the runway frame 121 in which the second roller wheel 1512 is combined with the second roller shaft 1511. The second roller shaft 1511 may be disposed with a predetermined interval in a direction perpendicular to the first roller shaft 1251 and rotatably combined with the supporting frame 154 which will be described later, and the second roller wheel 1512 may be combined with the second roller shaft 1511 to be rotated in a direction perpendicular to the second roller wheel 1512. The second roller wheel 1512 may be formed of a material same as the first roller wheel 1252 but formed with a diameter less than that of the first roller wheel 1252.

The transfer frame 152 may be provided at a medium height between the runway frame 121 and mounting frame 122 at an inner side of the runway frame 121 such that the second roller shaft 1511 is not interfered with the first roller shaft 1251. Furthermore, the transfer frame 152 may be combined with the lower frame 111 constituting the supporting body 110 by a fuselage elevation unit (hereinafter, abbreviated as a "second elevation unit") 153 such as a hydraulic cylinder.

A plurality of supporting frames 154 capable of supporting the second roller shaft 1511 in an independent manner may be combined with the transfer frame 152. The supporting frame 154 may be formed in a U shape and thus the second roller shaft 1511 may be rotatably combined between both open ends, and a lower end of the supporting frame 154 may be fixed and combined with an upper surface of the transfer frame 152. Accordingly, the second roller 151 is elevated at the same time together with the transfer frame 152 being elevated by the second elevation unit 153.

Furthermore, a motor for driving a second roller (hereinafter, abbreviated as a "second roller motor") 1515 to rotate the second roller 151 in a direction perpendicular to the rotation direction of the first roller 125 may be installed on the transfer frame 152, and the rotation shaft of the second roller motor 1515 may be mechanically connected to the second roller shaft 1511 by an electromotive member 1516.

The second roller 151 may be also connected to second roller motors 1515, respectively, in an independent manner similarly to the first roller 125, but a plurality of second rollers 151 may be connected to one second roller motor 1515 in an integrated manner.

On the other hand, the transport carriage 200 may be provided at the end or middle of the takeoff and landing guide apparatus 100 to carry and move the aircraft to a desired position such as a boarding gate, a hangar, or a maintenance depot, or the like. Furthermore, the transport carriage 200 may be formed in a similar shape to the takeoff and landing guide apparatus 100 excluding being equipped with an additional engine.

As illustrated in FIGS. 21 and 22, the transport carriage 200 may include a carriage body 210 provided with a separate engine, a wheel for carriage transfer (hereinafter, abbreviated as a "second transfer wheel") 220 provided at a lower end of the carriage body 210, and a roller for fuselage transfer (hereinafter, abbreviated as a "third roller") 230 rotatably combined with an upper surface of the carriage body 210 onto which the landing surface 11 of the aircraft fuselage 1 is slid and placed.

The carriage body 210 may be fabricated in a shape same as or similar to the supporting body 110 of the takeoff and landing guide apparatus 100.

The second transfer wheel 220 may include a second transfer wheel for the front and rear direction 221 and a second transfer wheel for the left and right direction 222 in a different way from the first transport wheel 113 of the takeoff and landing guide apparatus 100. Either one of the second transfer wheel for the front and rear direction 221 and the second transfer wheel for the left and right direction 222 may be combined with a transfer wheel elevation unit 225 such as a hydraulic cylinder to be elevated in a more lengthwise manner toward the ground direction compared to the other side second transfer wheel according to the transfer direction.

Furthermore, the second transfer wheels 221, 222 may be connected to a motor for driving a second wheel (hereinafter, abbreviated as a "second wheel motor") 226 provided at the carriage body 210. The second transfer wheels 221, 222 may be connected to the second wheel motors 226, respectively, in an independent manner, or a plurality of the second transfer wheels 221, 222 may be connected to one second wheel motor 226, respectively, in an integrated manner.

For the third roller 230, a third roller for the left and right direction 231 and a third roller for the front and rear direction 232 may be provided with the foregoing rollers 125, 151 of the takeoff and landing guide apparatus 100. The third roller 230 may be connected to the rotation shaft of a motor for driving a third roller (hereinafter, abbreviated as a "third roller motor") 235 provided at the carriage body 210 by an electromotive member. The third rollers 230 may be connected to the third roller motor 235, respectively, in an independent manner or a plurality of third rollers 230 may be connected to the third roller motor 235 in an integrated manner.

Furthermore, a guide rail 240 into which the rail catcher assembly 30 of the aircraft fuselage 1 is inserted to support the aircraft may be provided in the middle of the third roller 230, similarly to the guide rail 124 of the runway surface body 120.

A tumbling prevention unit 250 unfolded in an elongated manner toward both sides of the carriage body 210 may be further provided at both front and rear sides of the carriage body 210, thereby preventing the aircraft and transport carriage 200 from being unbalanced or tumbled by side wind or the like during the transfer of an aircraft.

In order to use the foregoing transport carriage 200, the second roller 151 of the takeoff and landing guide apparatus 100 is rotated in a direction perpendicular to the runway direction by the respective second roller motor 1515. At the same time, the third roller for the left and right direction 231 of the transport carriage 200 is also rotated in the same direction as the second roller by the third roller.

At this time, the second roller 151 of the takeoff and landing guide apparatus 100 is elevated higher than the first roller 125 by the second elevation unit 153 separately provided therein, thereby allowing the landing surface 11 of the aircraft fuselage 1 to be separated from an upper surface of the first roller 125.

Then, the aircraft fuselage 1 is transferred from the takeoff and landing guide apparatus 100 to the transport carriage 200 by the second roller 151 and second elevation unit 153, and the transport carriage 200 on which the aircraft has been carried transfers the aircraft to a required position.

On the other hand, a snow removal unit such as a brush may further provided at one side of the runway surface body to remove snow or other foreign substances piled up on the first roller of the runway surface body. The snow removal unit may be provided in such a manner that a brush is disposed in the left and right direction of the runway surface body to remove snow or foreign substances while being moved in a lengthwise direction of the runway surface body by an electromotive member such as a belt.

Furthermore, a fire extinguishing unit may be further provided between the aircraft fuselage and roller to spray extinguishing liquid such as water, foam extinguishing agent or the like. For the fire extinguishing unit, a plurality of extinguishing liquid spray nozzles capable of spraying extinguishing liquid may be provided along the lengthwise direction of the runway surface body, and an extinguishing liquid spray nozzle combined with a separate transfer apparatus may be provided to spray extinguishing liquid at a required moment while moving along the aircraft. to move and load the aircraft fuselage to a carriage for fuselage transportation is further provided at the takeoff and landing guide apparatus.

What is claimed is:

1. A fuselage takeoff and landing enabled aircraft, wherein a landing surface is formed at a bottom surface of the aircraft fuselage such that the aircraft fuselage is placed on a virtual runway surface to allow takeoff and landing,
    wherein a rail catcher assembly docked with a guide rail provided on the virtual runway surface to support the aircraft fuselage to maintain the center line of movement is provided on the aircraft fuselage.

2. The fuselage takeoff and landing enabled aircraft of claim 1, wherein a catcher accommodation space is formed to accommodate the rail catcher assembly in the aircraft fuselage, and
    a catcher draw-in/out unit for drawing in and out the rail catcher assembly is provided in the catcher accommodation space.

3. The fuselage takeoff and landing enabled aircraft of claim 2, wherein the rail catcher assembly is configured such that a plurality of members are combined with one another to be extended or contracted while being slid or rotated, and
    a support member is provided at an end portion of the rail catcher assembly such that the rail catcher assembly is restricted while being slid into the guide rail.

4. The fuselage takeoff and landing enabled aircraft of claim 1, wherein a catcher correction unit is provided between the aircraft fuselage and rail catcher assembly to move the rail catcher assembly in the left and right direction perpendicular to the runway direction with respect to the aircraft fuselage.

5. The fuselage takeoff and landing enabled aircraft of claim 1, wherein a shock absorption unit is provided at the aircraft fuselage to absorb a collision force due to a contact with the virtual runway surface.

6. The fuselage takeoff and landing enabled aircraft of claim 5, wherein the shock absorption unit is provided therein to be located at a front side of the central position of gravity or center of gravity on the basis of the center of gravity of the aircraft fuselage.

7. The fuselage takeoff and landing enabled aircraft of claim 5, wherein a rail catcher assembly docked with a guide rail provided on the virtual runway surface to support the aircraft fuselage to maintain the center line of movement is provided on the aircraft fuselage, and
    the shock absorption unit is located at both left and right sides of the rail catcher assembly.

8. An aircraft takeoff and landing system, comprising:
    a takeoff and landing guide apparatus having a runway surface body on which the aircraft fuselage of claim 1 is placed to allow takeoff and landing while the aircraft fuselage is slid in the runway direction,
    wherein a plurality of rollers for takeoff and landing to drive the aircraft while being rotated in the runway direction of the aircraft fuselage are provided on the runway surface body along the runway direction of the aircraft fuselage, and
    wherein a guide rail docked with the rail catcher assembly provided in the aircraft to guide the takeoff and landing of the aircraft is provided on the runway surface body along the runway direction of the aircraft fuselage.

9. The aircraft takeoff and landing system of claim 8, wherein the runway surface body is combined with an elevation unit for takeoff and landing for moving the runway surface body in the upward and downward direction.

10. The aircraft takeoff and landing system of claim 9, wherein the runway surface body is divided into a runway surface body for takeoff and landing and a runway surface body for run according to the runway direction of the aircraft fuselage, and
    the runway surface body for takeoff and landing is provided with the elevation unit for takeoff and landing.

11. The aircraft takeoff and landing system of claim 9, wherein the elevation unit for takeoff and landing detects a landing speed and a descending speed of the aircraft to control a descending speed of the runway surface body in interlock with the landing speed and descending speed of the aircraft.

12. The aircraft takeoff and landing system of claim 8, wherein the takeoff and landing guide apparatus comprises:
    a supporting body provided at the ground;
    a runway surface body provided at an upper surface of the supporting body; and
    an elevation unit for takeoff and landing provided between the supporting body and the runway surface body to move the runway surface body in the upward and downward direction with respect to the supporting body.

13. The aircraft takeoff and landing system of claim 12, wherein a wheel for movement is further provided at a lower end of the takeoff and landing guide apparatus to move the takeoff and landing guide apparatus along the ground.

14. The aircraft takeoff and landing system of claim 13, wherein a movement rail having a predetermined depth is installed on the ground to insert and move the wheel for movement.

15. The aircraft takeoff and landing system of claim 13, wherein a landing position correction unit is further provided between the aircraft and the takeoff and landing guide apparatus to allow the takeoff and landing guide apparatus to move according to the position of the aircraft fuselage.

16. The aircraft takeoff and landing system of claim 8, wherein the roller for takeoff and landing is provided to increase or decrease the rotation speed while being synchronized in interlock with the driving speed of the aircraft fuselage.

17. The aircraft takeoff and landing system of claim 8, wherein a roller braking unit is provided at at least one side of the roller for takeoff and landing to stop the rotation of the roller for takeoff and landing.

18. The aircraft takeoff and landing system of claim 8, wherein a carriage for fuselage transportation to move the aircraft fuselage from the runway surface body to another place is further provided at the middle or end of the takeoff and landing guide apparatus.

19. The aircraft takeoff and landing system of claim 18, wherein a plurality of rollers for transportation rotated in a different direction from the rotation direction of the roller for takeoff and landing are provided between the rollers for takeoff and landing.

20. The aircraft takeoff and landing system of claim 19, wherein a fuselage elevation unit for elevating the roller for transportation higher than the roller for takeoff and landing to move and load the aircraft fuselage to a carriage for fuselage transportation is further provided at the takeoff and landing guide apparatus.

* * * * *